United States Patent
Roy et al.

[19]

[11] Patent Number: 5,986,434
[45] Date of Patent: *Nov. 16, 1999

[54] CONTROLLER SYSTEM FOR A DC POWER SUPPLY

[75] Inventors: Steve Roy, LaSalle; Louis Duguay, Dollard des Ormeaux, both of Canada

[73] Assignee: Astec International Limited, The Hong Kong Special Administrative Region of the People's Republic of China

[*] Notice: This patent issued on a continued prosecution application filed under 37 CFR 1.53(d), and is subject to the twenty year patent term provisions of 35 U.S.C. 154(a)(2).

[21] Appl. No.: 08/936,729

[22] Filed: Sep. 25, 1997

[51] Int. Cl.⁶ .................................................. H01M 10/46
[52] U.S. Cl. ............................................ 320/128; 320/150
[58] Field of Search ...................... 320/116, 118, 320/128, 138, 140, 144, 150, 163, FOR 104, FOR 105, FOR 129, FOR 134, FOR 148, FOR 154, FOR 155

[56] References Cited

U.S. PATENT DOCUMENTS

| | | |
|---|---|---|
| 3,590,358 | 6/1971 | Ruben ..................................... 320/141 |
| 4,451,773 | 5/1984 | Papathomas et al. . |
| 5,047,961 | 9/1991 | Simonsen . |
| 5,162,721 | 11/1992 | Sato . |
| 5,218,287 | 6/1993 | Chen . |
| 5,290,643 | 3/1994 | Chen . |
| 5,332,927 | 7/1994 | Paul et al. . |
| 5,343,135 | 8/1994 | Mathieson . |
| 5,352,968 | 10/1994 | Reni et al. . |
| 5,404,090 | 4/1995 | Shinbori . |
| 5,541,489 | 7/1996 | Dunstan . |
| 5,587,924 | 12/1996 | Rossi . |
| 5,656,923 | 8/1997 | Schultz et al. . |
| 5,666,040 | 9/1997 | Bourbeau ................................ 320/118 |

*Primary Examiner*—Edward H. Tso
*Attorney, Agent, or Firm*—Coudert Brothers

[57] ABSTRACT

The DC power supply system has a separate controller connected to the AC power rectifiers via a control bus. Improved control features and modularity are achieved.

21 Claims, 24 Drawing Sheets

CONTROLLER SYSTEM FOR A DC POWER SUPPLY

FIELD OF THE INVENTION

The present invention relates to a controller system for use with a DC power supply system for telecommunications equipment.

BACKGROUND OF THE INVENTION

Batteries as principal or backup power sources have numerous applications in such industries as computer technology and telecommunications. In these applications, it is important that the battery be maintained at a fully charged condition in order to function properly when needed.

One particular application for batteries is as an emergency power source for telecommunications equipment located outdoors. If the regular power supplied by an AC source fails, the battery must be able to provide the necessary voltage until such time as the AC power is restored. It is common in such applications that a battery charger be connected across the batteries such that they are constantly maintained at the proper voltage levels. In a 48 volt DC battery string, the charge currents from the AC rectifier can be large enough that the voltage drop across the charging leads is noticeable. Since small changes in voltage at the batteries are significant in controlling the rate of charge, it has been found that minor errors in charge control are introduced when the battery voltage is measured across the battery terminals using long sense leads connected to the voltage measurement circuit.

In U.S. Pat. No. 5,666,040 granted to Bourbeau, a networked battery monitor control system and charging method is disclosed in which individual battery conditions are detected for each battery in a string of batteries by electronic modules. The electronic modules produce a go/no-go signal for each of four battery conditions: over-voltage, under-voltage, over-temperature and float-voltage. The go/no-go signals are read by a network controller connected to each module via a single three-wire local area network (LAN). Over-voltage to any individual battery can be limited by connecting by-pass resistors across individual batteries. Charging current to the string of batteries can be adjusted by the controller in response to over-voltage detected by one or more of the modules connected to the individual batteries in the string. In Bourbeau, the battery charger current and voltage are not variably controlled in response to a variable battery voltage. The object of the Bourbeau reference is to provide a simplified networked battery monitor and control system in which the individual characteristics of each battery in a string of batteries can be monitored and compensated while allowing the battery string to be charged and discharged as a group.

SUMMARY OF THE INVENTION

It is an object of the present invention to provide a control circuit section for controlling a power rectifier having a control bus interface between the control section and the rectifier which allows the control section to be physically separate from the rectifier unit. In this way, a single control section can control a number of rectifiers. The rectifiers may be interconnected to operate in unison, e.g., at the same voltage. It is a further object of the present invention to provide a control section separate from the rectifier which can communicate with a remote telecommunications network for relaying information on the operation of the rectifier, state of the batteries and other parameters known to the control section.

According to the invention, there is provided a controller system for use with a DC power supply system for telecommunications equipment, the system including at least one power rectifier having a controllable DC output current and voltage and at least one battery being charged by the rectifier and providing DC power during absence of AC power to the rectifier, the controller system comprising: a controller unit provided separate from the rectifier; voltage sense leads connected across the battery to measure a DC voltage thereof and connected to the unit; a control signal bus connecting the unit to the rectifier; and control means associated with the unit for monitoring at least a voltage of the battery and generating variable control signals on the bus for controlling the controllable DC output current and voltage of the rectifier. In this way, the bus signals facilitate interconnection between the rectifier and the separate controller unit.

According to the invention, there is also provided a DC power supply system for telecommunications equipment comprising: a plurality of power rectifiers having a controllable DC output current and voltage; means interconnecting the power rectifiers to operate synchronously at a same voltage; at least one battery being charged by the rectifiers and providing DC power for the telecommunications equipment during absence of AC power to the rectifier; a controller unit provided separate from the rectifiers; voltage sense leads connected across the battery to measure a DC voltage thereof and connected to the controller unit; a control signal bus connecting the controller unit to the rectifiers; and control means associated with the controller unit for monitoring at least a voltage of the battery and generating variable control signals on the bus for controlling the controllable DC output current and voltage of the rectifiers. In this way, the bus signals facilitate interconnection between the rectifiers and the separate controller unit.

BRIEF DESCRIPTION OF THE DRAWINGS

The invention will be better understood by way of the following detailed description of a preferred embodiment with reference to the appended drawings in which.

DETAILED DESCRIPTION OF THE PREFERRED EMBODIMENT

Figure 1:
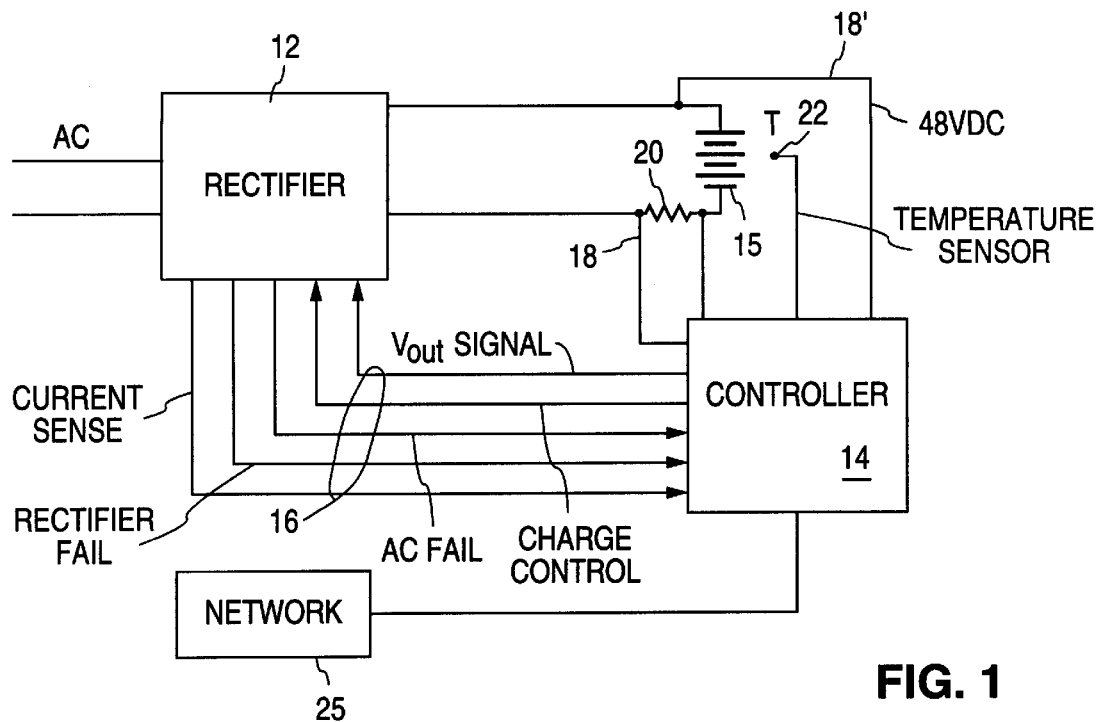
FIG. 1 is a schematic block diagram of a DC power supply system for telecommunications equipment including the controller system according to the preferred embodiment.

As shown in FIG. 1, the DC power supply system for supplying DC power to telecommunications equipment comprises a power rectifier 12 receiving power from AC mains and converting the power to 48 volts DC. The DC power is supplied to a battery 15 to provide uninterruptable DC power for the telecommunications equipment. A controller 14 is provided separate from the rectifier 12 and in proximity to the battery 15. The battery 15 may comprise a bank of batteries. A control signal bus 16 is provided between the controller 14 and the rectifier 12 in order to communicate back and forth the necessary control signals to provide for smooth operation of the rectifier 12 and proper battery charging conditions. The controller 14 has sense leads 18 and 18' for sensing the battery voltage. A small in-line resistance 20 is provided so that the controller 14 can measure current through battery 15. Controller 14 also has a communications interface for communicating with a network 25 for reporting on the status of the rectifier 12. It is possible that control commands from the network 25 be used to change the mode of operation of controller 14 and also to allow for remote inspection or testing of the DC power supply system.

The control signal bus 16 may contain a greater number of control signals than illustrated in FIG. 1. As illustrated in FIG. 1, the controller 14 outputs a signal indicating the measured voltage of the battery. The Vout signal is a multiple level voltage signal representing the measured battery voltage taken across the terminals of battery 15. By measuring the battery voltage directly at the terminals, the voltage drop across the lines connecting the rectifier 12 to battery 15 does not interfere with proper control of the rectifier 12 to generate an appropriate voltage level for charging battery 15. A Charge Control signal is also output by controller 14 for indicating whether the rectifier 12 is to provide a high current level or a low current level to battery 15. The rectifier 12 outputs an AC fail signal which is a binary state signal indicating the presence of AC mains power. If the controller 14 receives the AC fail signal to indicate that the AC power mains are down, the controller 14 will begin monitoring battery discharge and may inform network 25 as to the AC mains failure and report on the discharge state of batteries 15.

Similarly, a Rectifier Fail control signal is sent from rectifier 12 to controller 14. The controller 14 similarly responds to the Rectifier Fail signal by monitoring discharge of battery 15 while sending out an emergency repair call to network 25. A Current Sense bus signal is sent from rectifier 12 to controller 14 for providing controller 14 with a measurement of the current being supplied by rectifier 12 to battery 15.

With reference to FIGS. 2 through 12, control features according to the preferred embodiment will be described.

Figure 2:
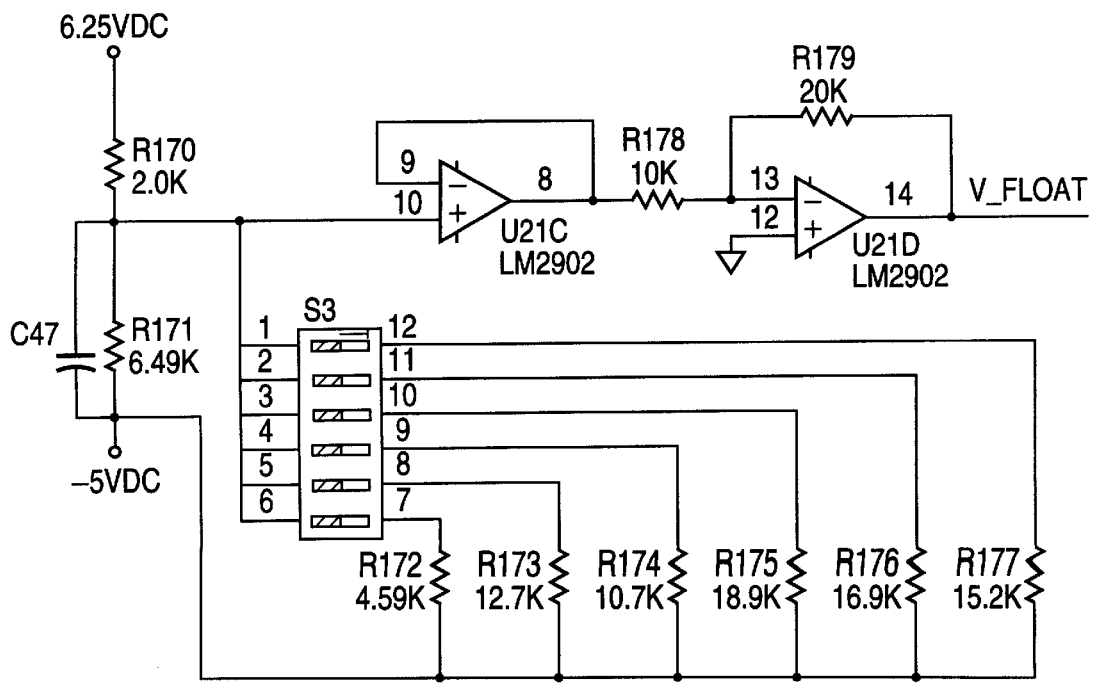
FIG. 2 illustrates the float level selection circuit according to the preferred embodiment.

The control card of controller 14 controls the rectifier output voltage. As shown in FIG. 2, this float level adjustment is made through a DIP switch where predetermined levels can be set. The rectifier output voltage is nominally set at −54.5 VDC. The control card directly controls the rectifier output voltage by supplying a "REF_VOLT signal to the rectifier. Through the rectifier control-to-output gain, the REF_VOLT signal is directly added to the output voltage and becomes the new commanded voltage:

Vout rect.=−54.5 V+VREF_VOLT

| REF VOLT | Rectifier Output Voltage |
|---|---|
| 6.50 | −48.00 |
| 2.50 | −52.00 |
| 1.50 | −53.00 |
| 0.50 | −54.00 |
| 0.00 | −54.50 |
| −0.50 | −55.00 |
| −1.00 | −55.50 |

The circuit simply consists of a resistor divider, from which the desired voltage is controlled by a DIP switch which adds or subtracts paralleled resistors to lower or increase the control voltage. The main resistor divider consists of R170 and R171, which are connected between the 6.25 V and −5 V reference voltage rails. S3 is the DIP switch which cotrols the divided voltage level and switches in or out R172 to R177. The divided voltage is then processed through a buffer, U21C, and a voltage doubler U21D. The REF_

VOLT signal is equal to this control voltage, V_FLOAT, if the TCM function (described below) is not selected. It is processed through a summing amplifier, U21A and a buffer, U21B.

Temperature Compensation Circuit (TCM)

Figure 3:
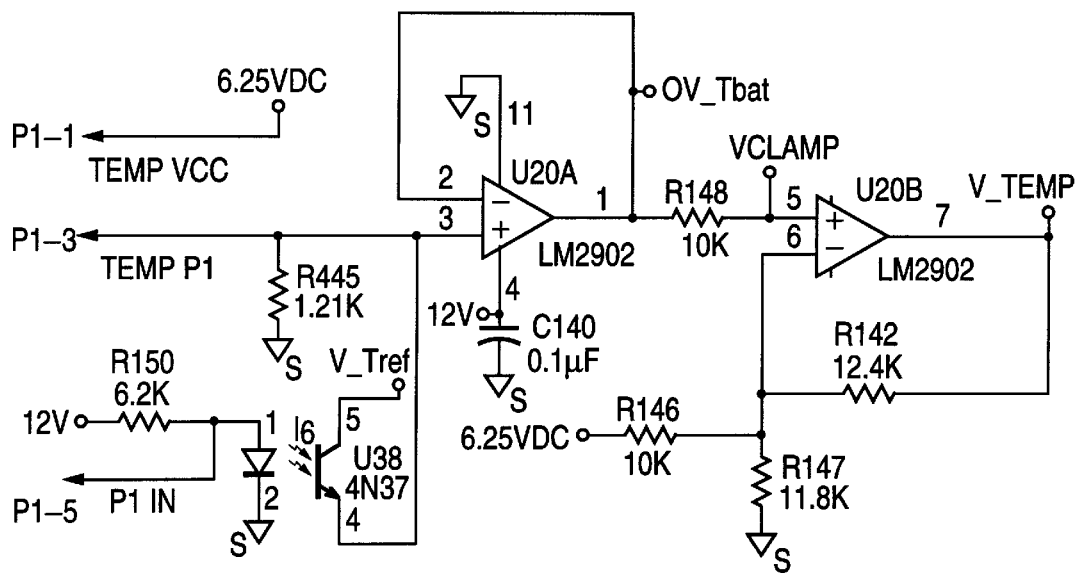
FIG. 3 illustrates the temperature-to-voltage conversion circuit according to the preferred embodiment.
Figure 4:
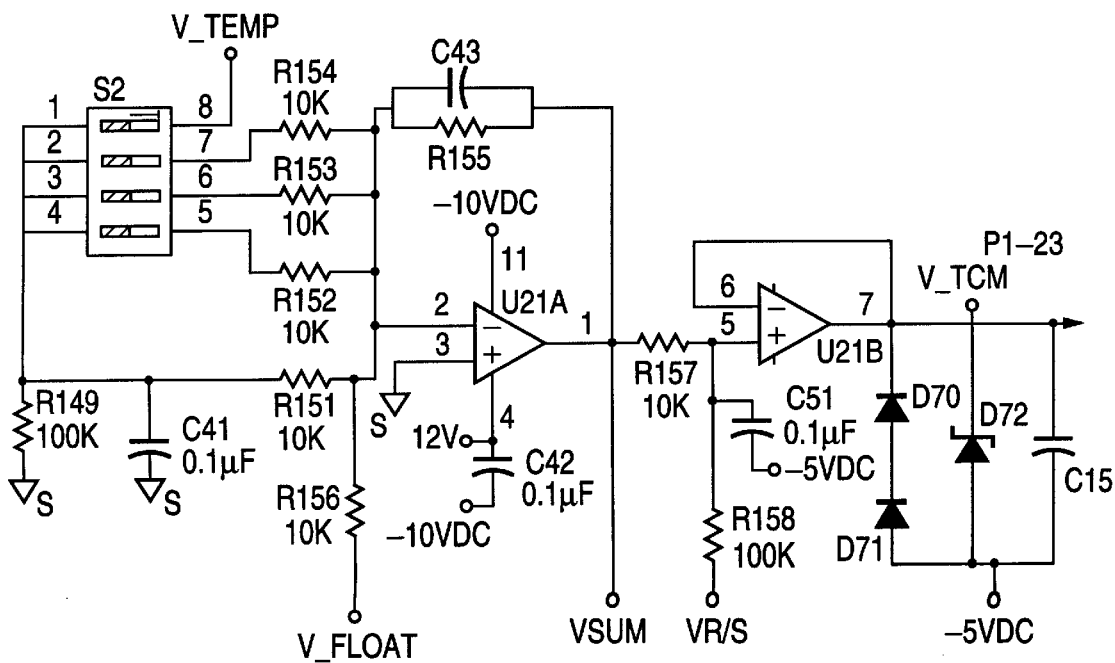
FIG. 4 illustrates the slope selection, summer and buffer circuit according to the preferred embodiment.

As shown in FIG. 3, the TCM function consists in making the REF_VOLT signal temperature dependent. Four slopes have been defined: 36, 72, 108 and 144 mV/°C and are selectable through DIP switch S2 (FIG. 4). The external temperature sensor is connected between pins 1 and 3 of the connector. When the temperature probe is connected, P1-5 is connected to the BR and makes this probe the active temperature measurement mean. The probe temperature sensor resistance varies with temperature. Resistor R445 is connected from the sensor to the signal ground to linearize the voltage versus temperature slope.

As shown in FIG. 3, the resulting temperature dependent voltage is processed through a buffer, U20A, and amplifier, U20B, which corrects the temperature slope. As shown in FIG. 4, the resulting signal is added to the REF_VOLT signal through U21A. Resistor R151 sets the summing gain at 1. With DIP switch S2, resistors R152, R153 and R154 are paralleled in and out with R151 to change the summing gain, thus the slope.

Figure 5:
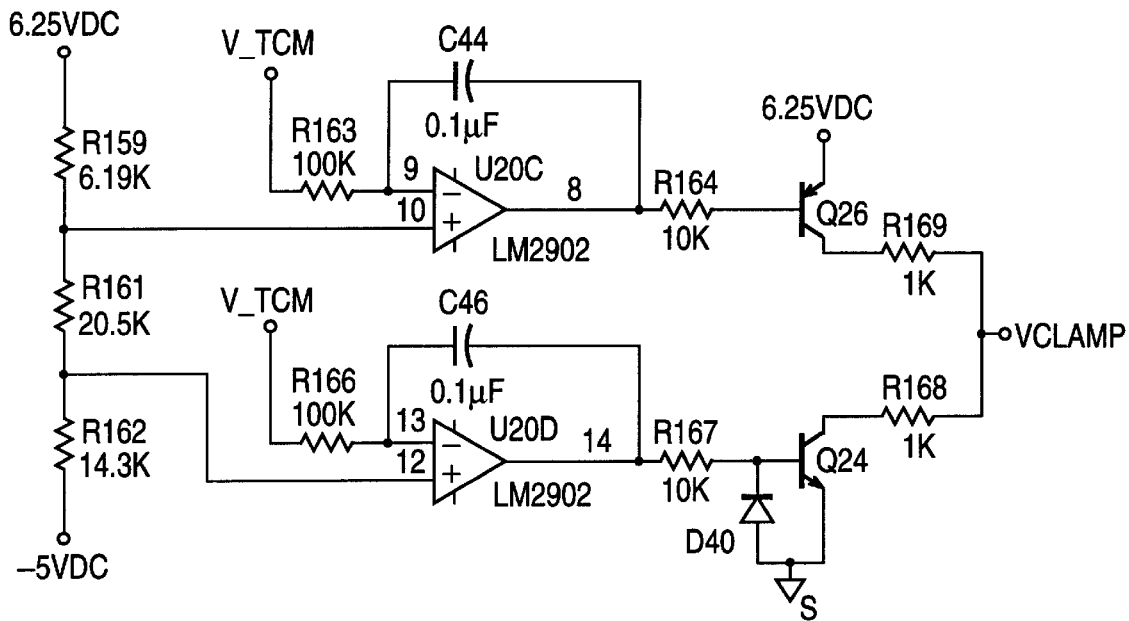
FIG. 5 illustrates the temperature clamping circuit according to the preferred embodiment.
Figure 6:
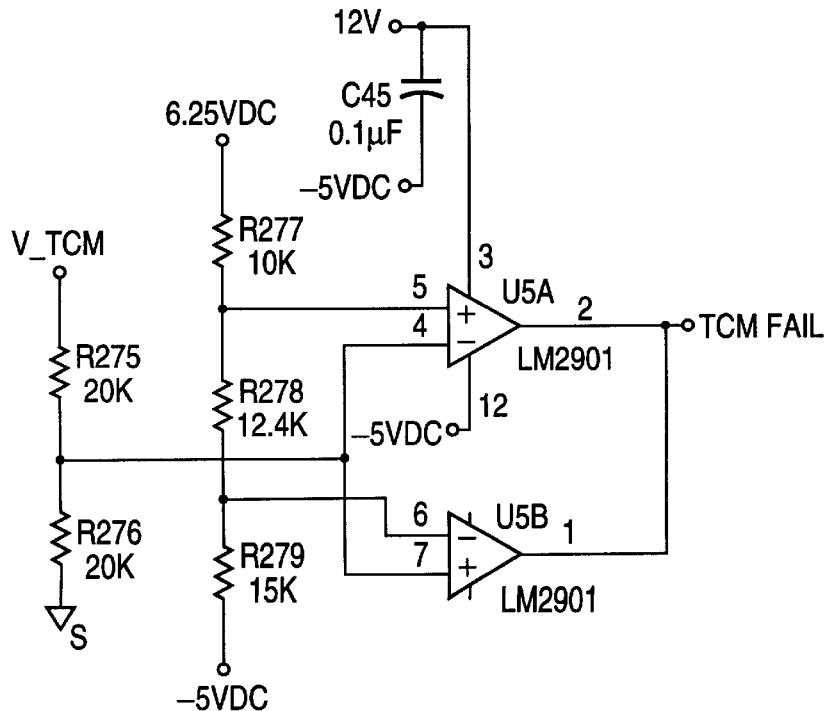
FIG. 6 illustrates the temperature control module fail circuit according to the preferred embodiment.

As shown in FIG. 5, when the TCM is used, the REF_VOLT signal is constantly monitored and clamped so that the output voltage does not exceed −55.6V (−1.1V) and does not go below −50 V (4.5V). If the REF_VOLT signal exceeds 4.5V, U20C goes low, turns ON Q26 and will clamp the temperature dependent signal voltage at the output of U20A. If the REF_VOLT signal goes below −1.1V, U20D goes high, turns ON Q24 and will clamp the temperature dependent signal voltage at the output of U20A. In the event of a circuit failure, another circuit as shown in FIG. 6 will limit the REF_VOLT signal voltage excursions to 6.8 and −1.4V. This will then activate the controller fail (TCR FAIL) through U5A and U5B.

Internal Temperature Sensor

Figure 7:
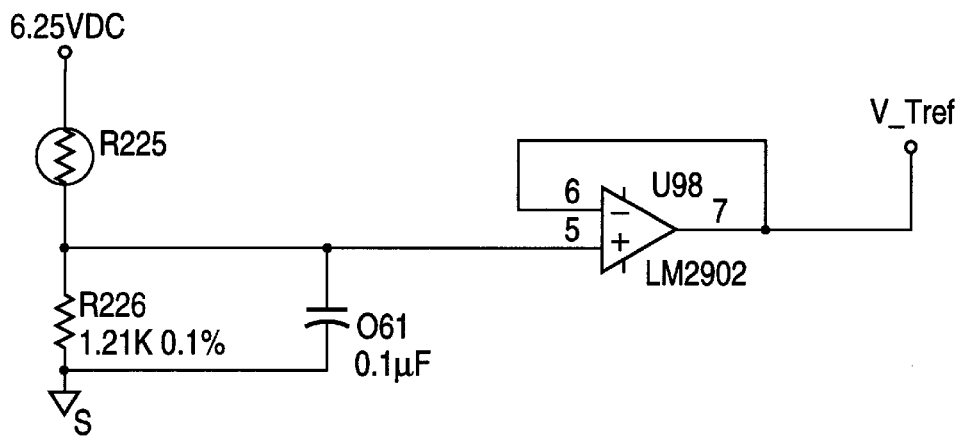
FIG. 7 illustrates the internal temperature-to-voltage conversion circuit according to the preferred embodiment.

As shown in FIG. 7, in the event that the temperature probe is disconnected or that the TCM function is desired, but without having an external probe, the control card of controller 14 has its own temperature sensing circuit. Resistors R225 and R226 provide a temperature dependent voltage, which is filtered by C61 and buffered by U9B. When the temperature probe is not present, connection P1-5 (FIG. 3) is floating. Optocoupler U38 is then energized and connects the internal temperature voltage from U9-7 to U20-3 through the saturated opto-transistor of U34. The TCM functionality is maintained as long as S2-1 is ON.

Remote Sensing

Figure 8:
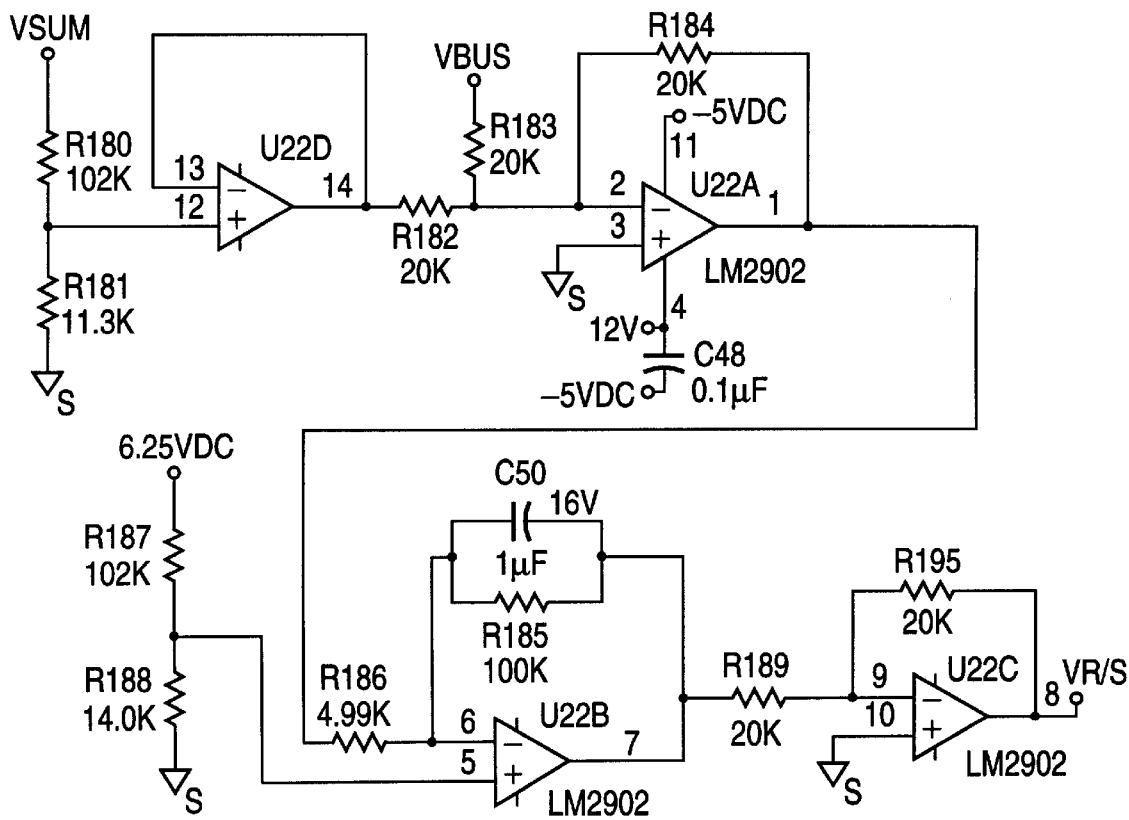
FIG. 8 illustrates the remote sense compensation circuit according to the preferred embodiment.

As shown in FIG. 8, in the distribution scheme of the present invention, it is possible that voltage drops due to internal wiring or PCB copper traces decrease the DC output voltage. To compensate for this undesired voltage drop, the control card of the controller 14 monitors the battery voltage and compares it to the programmed output voltage at U22A. Signal Vbus provides a scaled down signal of the DC output voltage. R180 and R181 reduces the selected float level signal to a level compatible to Vbus. Both signals are added through R182, R183, R184 and U22A. In the event of a voltage drop on the bus, the (Vbus+Vfloat) sum is below the voltage set by resistor divider R187 and R188, the output of U22B goes high and the output of U22C goes low, thus artificially lowering the voltage VR/S that is applied to the non-inverting input of U21B (FIG. 4), and therefore lowering the REF_VOLT signal. This will then raise the DC output voltage.

Rate of Charge Control

Figure 9:
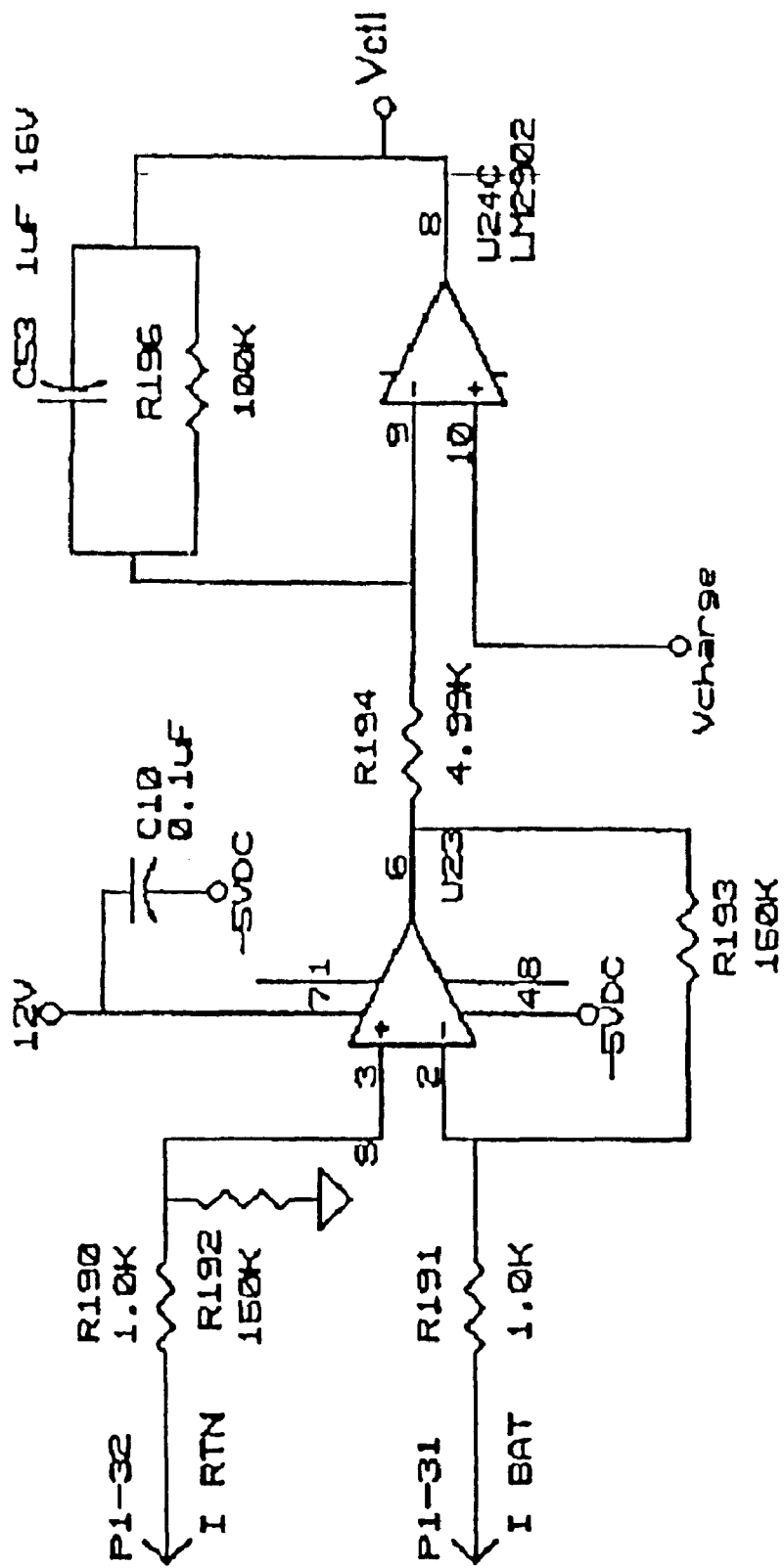
FIG. 9 illustrates the current sense amplifier and summing circuit according to the preferred embodiment.
Figure 10:
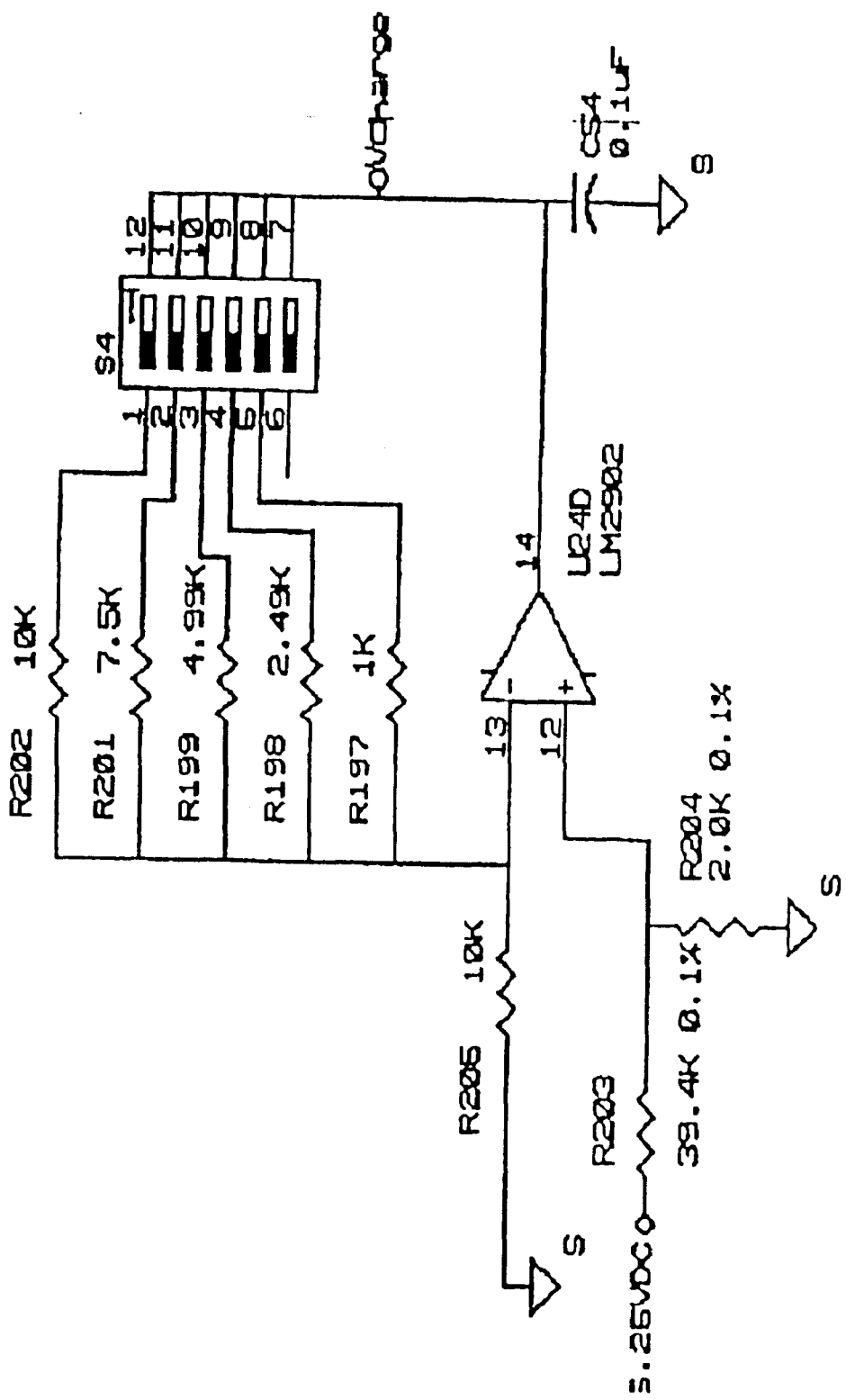
FIG. 10 illustrates the charge control level setting circuit according to the preferred embodiment.
Figure 11:
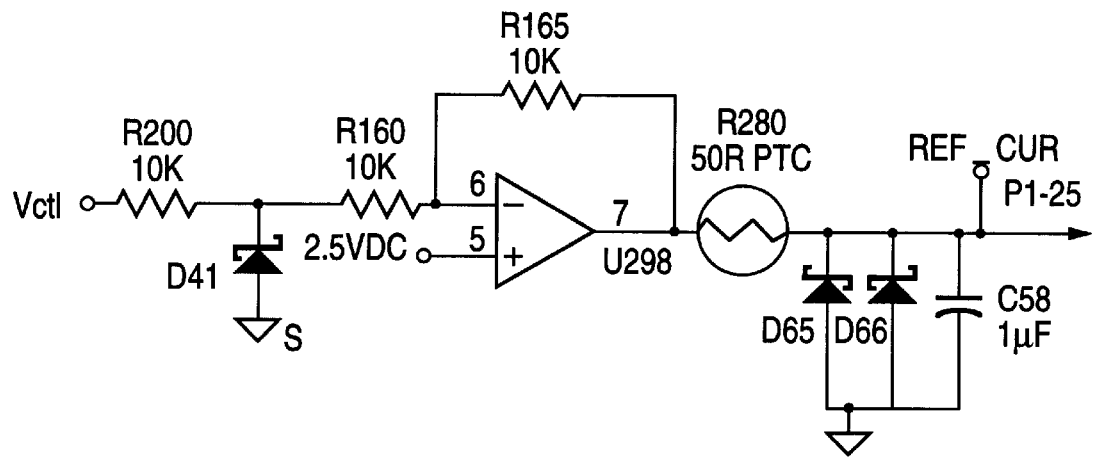
FIG. 11 illustrates the charge control output buffer circuit according to the preferred embodiment.

The circuit shown in FIG. 9 controls the current limit level of the rectifiers as follows: 0 V at the REF_CUR input corresponds to 100% current limit and 5V, to 10%. The battery current is sensed and amplified through a differential amplifier consisting of R190 to R193 and U23. As shown in FIGS. 10 and 11, the desired constant current is selected by DIP switch S4, U24D and resistors R197, R198, R199, R201 to R204 which modify the reference voltage of the current feedback amplifier, U24C, which gain is controlled by R196, C53 and R194 (FIG. 9). Operational amplifier U29B acts as a level shifter to provide the right voltage range to the rectifier.

Figure 12:
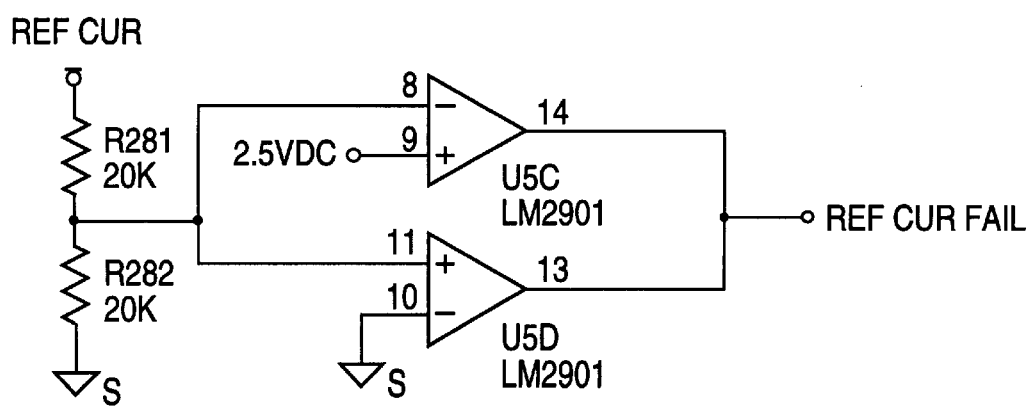
FIG. 12 illustrates the charge control circuit failure detection circuit according to the preferred embodiment.

As further shown in FIG. 11, diodes D41, D65 and D66 act as voltage clamps to maintain the REF_CUR signal within safe operating limits. As shown in FIG. 12, when D65 or D66 are forward biased, the controller fail (REF CUR FAIL) is activated through U5C and U5D. This will then activate the controller fail (CTL ALM) through U5A and U5B.

With reference to FIGS. 13 to 30, operation of the DC power supply system according to the second embodiment will be described.

Control of the Boost Converter

Figure 13:
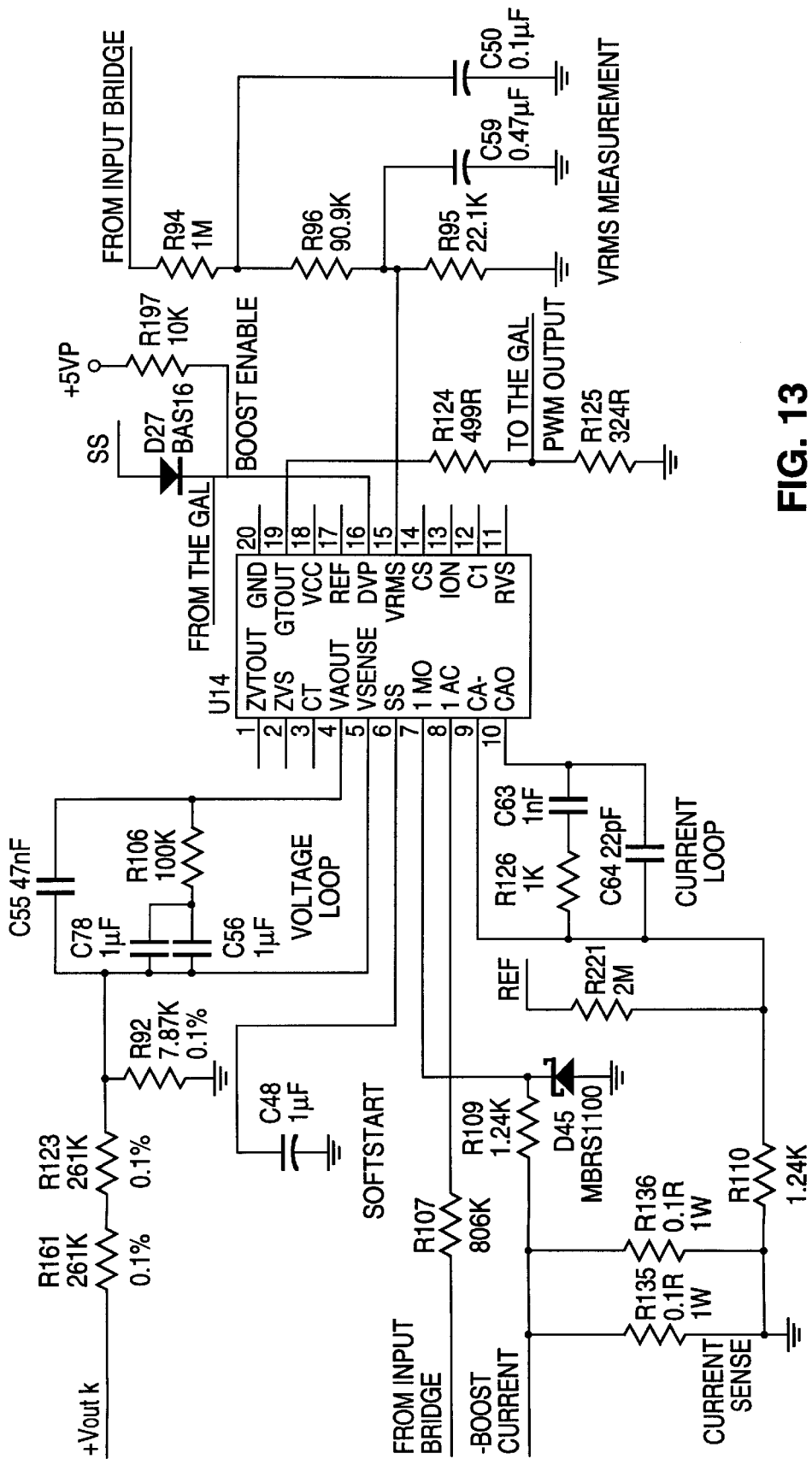
FIG. 13 illustrates a control circuit of a boost converter according to the second embodiment.

As shown in FIG. 13, PWM IC U14 regulates the bulk capacitor voltage at 200 Vdc and performs power factor correction. The bulk capacitor (C73, C74, C75) voltage is controlled by an error amplifier inside U14. Pin 5 is the inverting input of the amplifier and serves as the output voltage feedback point. It senses the output voltage through a voltage divider consisting of R161, R123, and R92, which produces a nominal 3V. The voltage loop compensation, consisting of R106, C55, C56 and C78, is connected between pin 5 and pin 4, which is the output of the voltage error amplifier.

The output of the voltage error amplifier gives the magnitude of the current reference. In order to achieve near unity power factor, the input current reference must be sinusoidal. A sine wave shape is obtained from the current flowing through resistor R107, which is proportional to the rectified input voltage, and is fed to pin 8 of the U14. R107 also determines the current limit. Pins 4, 8 and 15 are the inputs to a multiplier inside U14. The sine wave shape, the magnitude of the reference signal and the signal at pin 15 are multiplied together to provide the appropriate input current reference.

Pin 15 is the feedforward line voltage compensation input to the multiplier. The voltage on this pin, VRMS, is a DC voltage that is proportional to the AC input RMS voltage, and is squared before being fed to the multiplier. The current command signal is multiplied by $1/VRMS^2$ so that the input power level (and therefore the output power level) does not change when the input voltage is changed. The input to pin 15 is derived from a two pole low pass filter/voltage divider consisting of R94, R95, R96, C50 and C59 connected to the rectified AC input voltage. The filter attenuates the large second harmonic of the rectified AC voltage to reduce the amount of ripple that is injected into the input current reference by the multiplier. This ripple can corrupt the current reference and can cause a significant third harmonic to appear in the input current.

The input current is sensed by R135 and R136 and fed to pin 7, which is the non-inverting input of the current error amplifier. Pins 9 and 10 are the inverting input and output. The current loop is set by R109, R110, R126, C63 and C64, and is much faster than the voltage loop. The current amplifier output is compared to the sawtooth ramp at pin 3 and the gating signal of Q6 is determined (pin 19). This signal is stepped down by the voltage divider circuit (R124 and R125), then fed to pin 8 of the GAL (FIG. 14), where it is used to generate the gating signal for switches Q4 and Q5. The GAL generates the gating signal of Q1 and Q8 in synchronization with the signal from pin 19. U14 has a soft start feature that is set by connecting C48 to pin 6.

Control of the Forward Converter

Figure 15:
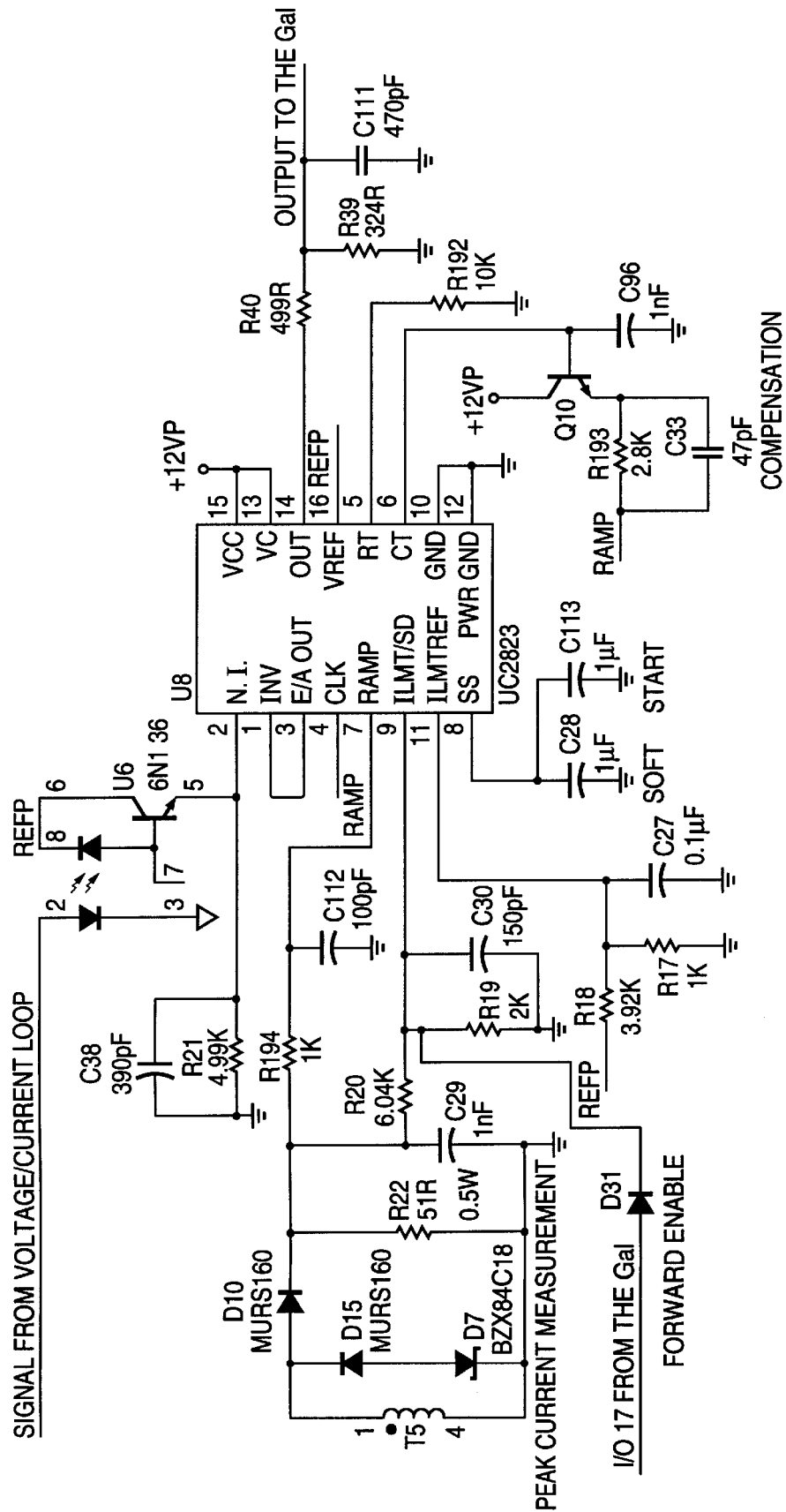
FIG. 15 illustrates a control circuit of the forward converter.

As shown in FIG. 15, the forward converter operates at a fixed switching frequency of 200 kHz. PWM IC U8 performs current mode control using pulse by pulse current limiting to regulate the peak output inductor current. The output current is sensed by T5 at the secondary of transformer T2. The signal from T5 is added to a compensating ramp obtained from Q10, C33 and R193 to eliminate the variation in average output inductor current due to changes in the duty cycle. The resulting waveform is fed to pin 7. The voltage reference used by U8 comes from the optocoupler U6 as described with reference to FIG. 26 below. PWM U8 has a soft start feature that is set by connecting C28 and C113 to pin 8, and a shutdown feature at pin 9. The forward converter shuts down when the GAL sends a high level signal to pin 9.

Synchronization

The operation of the boost converter, the forward converter, and the auxiliary power supply is synchronized with each other. Although the PWM IC used for the boost converter (U14) has an internal oscillator that produces a sawtooth waveform needed to generate the gating signals of the boost converter switches, this waveform cannot be synchronized with the operation of the other converters. A sawtooth waveform must therefore be generated by some external means (see FIG. 16a). The GAL gives a low level signal to C62 that turns ON transistor Q5, which charges capacitor C49 so that a flip flop inside U14 can be triggered. When Q5 opens, C49 discharges and another cycle begins. It is the charging and discharging of C49 that produces the required sawtooth waveform, which has a frequency of 400 kHz.

Figure 16A:
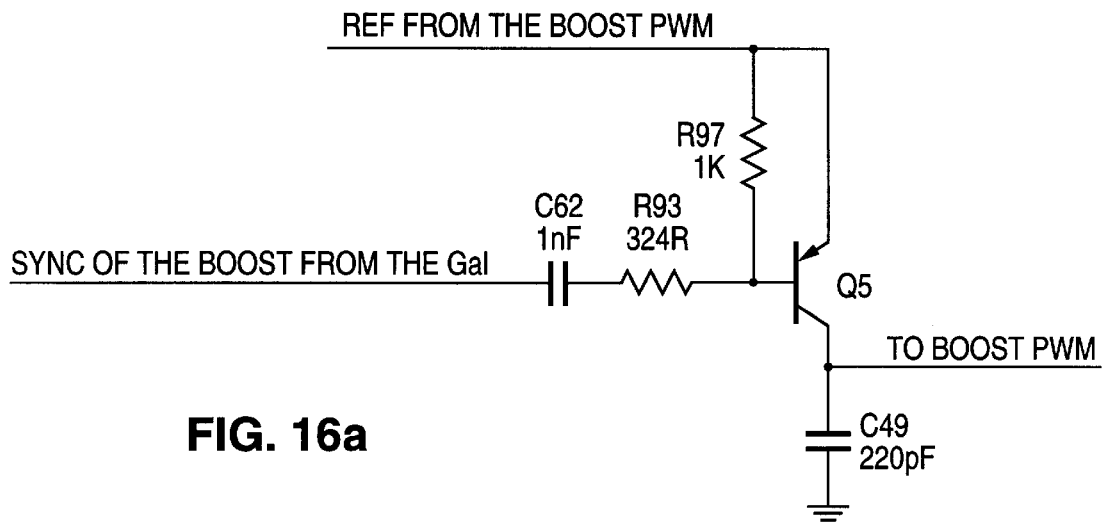
FIG. 16a illustrates a synchronization circuit of the boost converter according to the second embodiment.
Figure 16B:
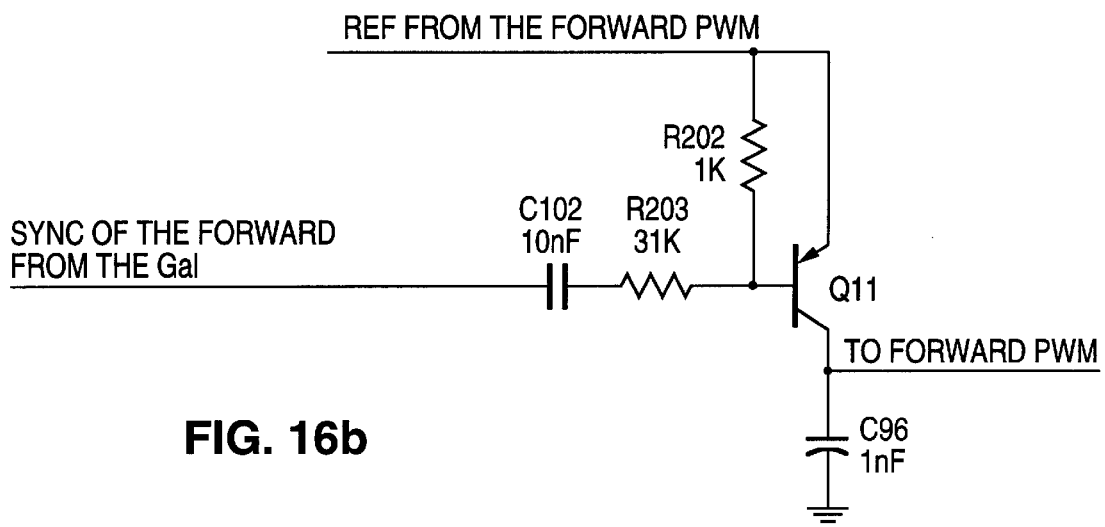
FIG. 16b illustrates a synchronization circuit of the forward converter according to the second embodiment.
Figure 16C:
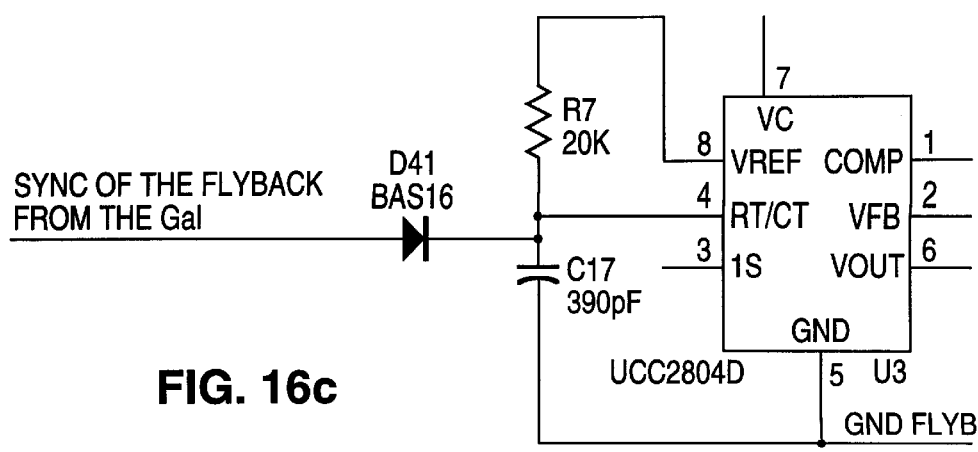
FIG. 16c illustrates a synchronization circuit of the flyback according to the second embodiment.

A similar circuit is used to produce a 400 kHz sawtooth waveform for PWM chip U8 (FIG. 16b). The GAL gives a low level signal to charge capacitor C102 and turn ON transistor Q11. This charges capacitor C96 which triggers a flip-flop inside PWM U8. When Q11 opens, C96 discharges and another half-cycle starts. The switching frequency of the sawtooth waveform has been set to 400 kHz instead of 200 kHz because the flip flop of this chip must be triggered twice during each cycle. The GAL gives a high level signal to pin 4 of auxiliary power supply control IC U3 through D41 (FIG. 16c) that triggers the PWM flip-flop inside the chip. The frequency of this synchronization signal is 200 kHz because the auxiliary supply operates at 100 kHz and the flip flop, like that of U8 PWM, must be triggered twice during each switching cycle.

Boost MOSFET Gating Signals and Drives

Figure 17:
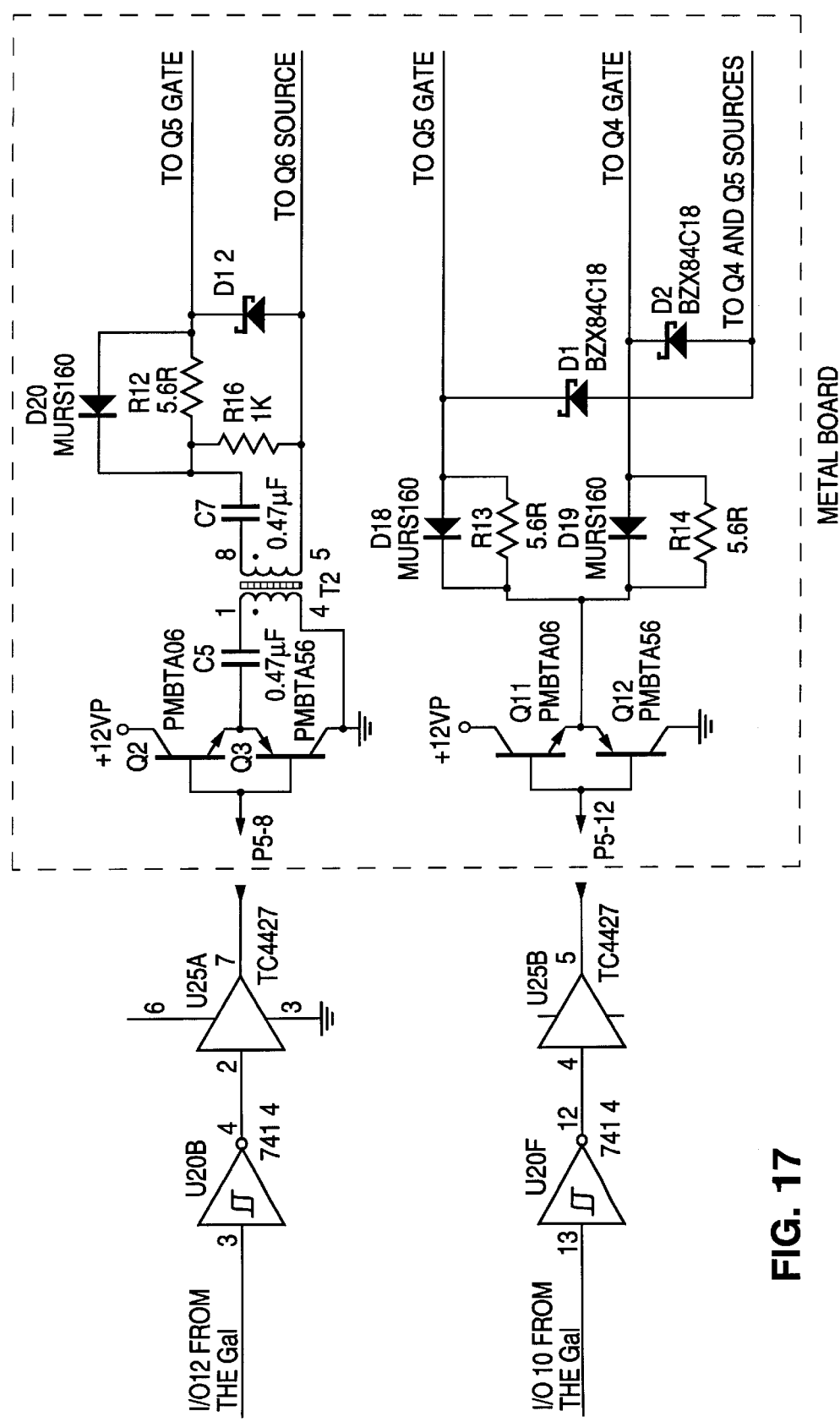
FIG. 17 illustrates a drive circuit of the MOSFETS of the booster converter according to the second embodiment.

As shown in FIG. 17, the gating signal for switch Q6 that is produced by PWM chip U14 is stepped down by a voltage divider (R124 and R125) and fed into the GAL. The GAL then uses the gating signal for Q6 to generate a gating signal for switches Q4 and Q5. These signals are each fed to schmitt triggers U20B and U20F respectively to reduce their immunity to noise, and the two outputs go to buffers U25A and U25B before going from the main board to the metal board. The output of buffer U25A is buffered by a totem pole circuit (Q2 and Q3) then fed to pulse transformer T2 of the high side Q6 MOSFET drive. Series capacitors C5 and C7 eliminate the DC component of the signal so that T2 does not saturate. Since the drives for Q4 and Q5 are not floating, there is no need for an isolation transformer and the signal from buffer U25B is fed directly to these drives. Zener diodes are placed across the gates of all of the MOSFETs for voltage overshoot protection, and resistors are placed in series for damping.

The two bottom MOSFETs shown in FIG. 17 are always ON except for a brief time interval when they are turned OFF just before turning ON the top MOSFET. Both bottom MOSFETs must be turned OFF at the same time for soft-switching to occur. The GAL generates the necessary OFF time by considering the synchronization pulse for the timing and the period of the natural resonant oscillation of the current L1.

Forward MOSFET Gating Signal and Drives

Figure 18:
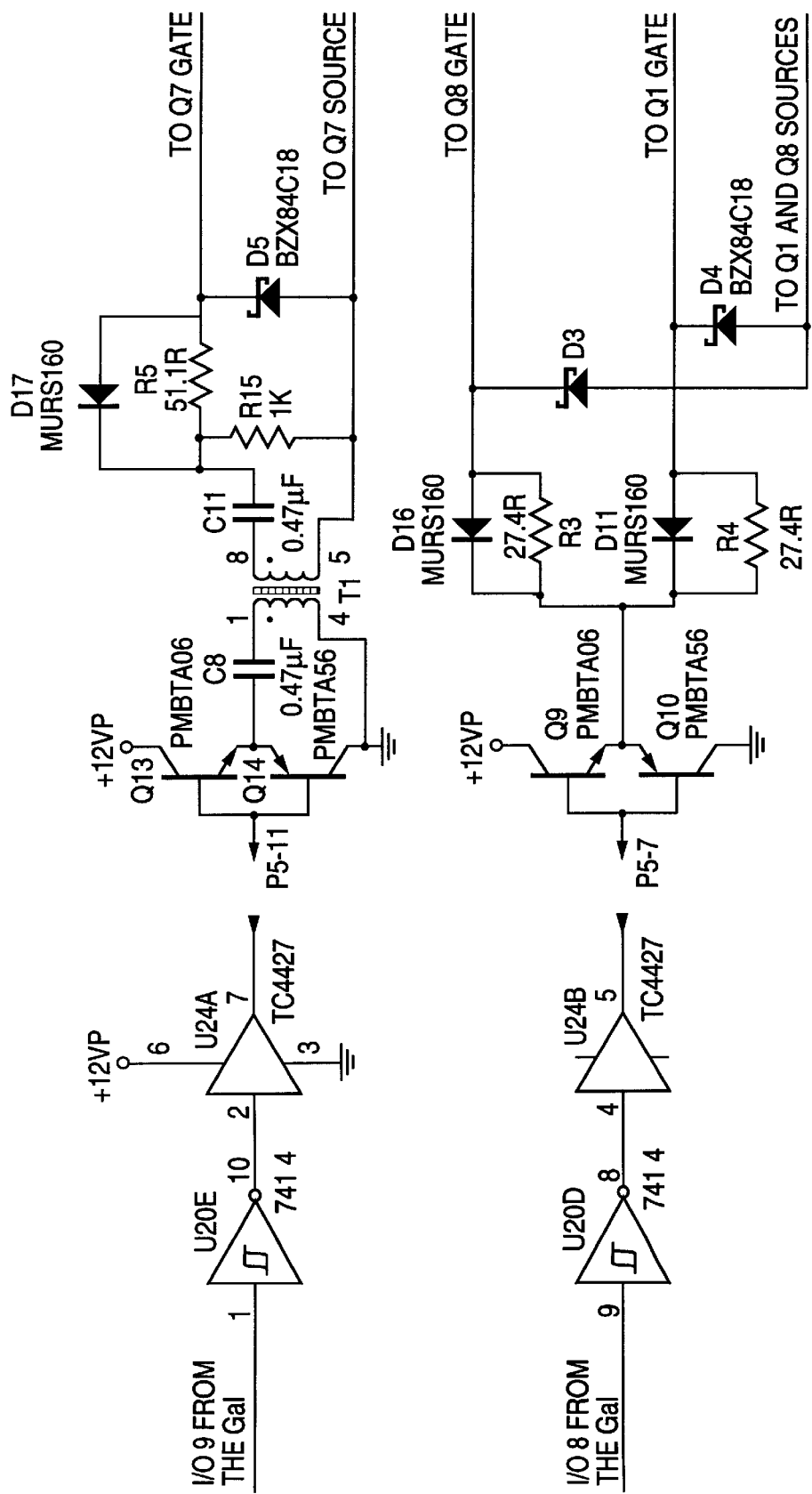
FIG. 18 illustrates a drive circuit of the MOSFETS of the forward converter according to the second embodiment.

As shown in FIG. 18, the gating signal for Q1 and Q8 that is sent out from pin 14 of PWM U8 is reduced by the resistive voltage divider consisting of R39 and R40, filtered by C111, then fed to pin 40 of the GAL. The gating signal of Q7 is dependent on the gating signal of Q1 and Q8 and is derived directly from it by the GAL. Q7 should be ON only during the time that Q1 and Q8 are OFF and never when these switches are ON. It is ON for at least half of the period because the duty cycle is always less than 50%. Since the body diode of the Q7 conducts current for half the time this MOSFET is ON, Q7 therefore conducts current for at least 25% of the period, just before the bottom MOSFETs are turned ON. Like the boost converter MOSFET gating signals, the gating signals for the forward converter are sent by the GAL (U17) to schmitt triggers U20D and U20E), then to buffers (U24A and U24B), and finally to the gate drive circuits on the metal board. The gate drive circuits for the forward converter MOSFET are the same as those for the boost converter MOSFETs.

Boost Enable/Disable

As shown in FIG. 13, the boost converter is disabled whenever a high level signal from pin 7 of the GAL is sent to pin 16 of U14. This happens during auxiliary power supply start-up, during a temporary release, when the input voltage is outside the proper range, or when the bulk capacitor voltage is too high.

Forward Enable/Disable

As shown in FIG. 15, the forward converter is disabled whenever a high level signal from pin 39 of the GAL is sent through diode D31 to pin 9 of U8. This happens during auxiliary power supply start-up, during a temporary release, during a High Voltage shutdown, when the bulk capacitor (C73, C74, C75) voltage is out of range, or when the input voltage is higher than the upper limit.

Auxiliary Power Supply

Figure 19:
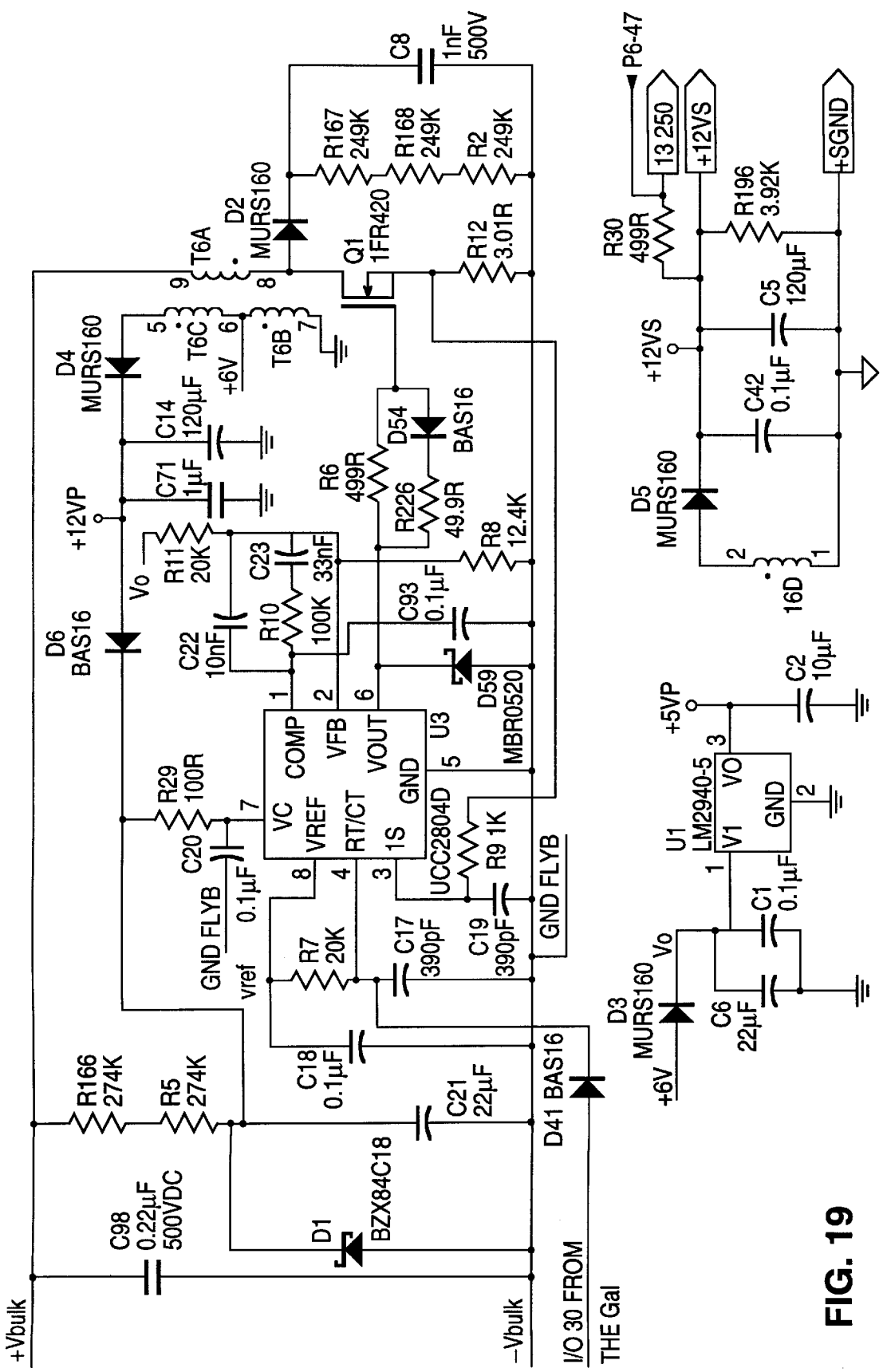
FIG. 19 illustrates an auxiliary power supply circuit according to the second embodiment.

As shown in FIG. 19, the auxiliary power supply provides the power to all ICs and control and monitoring circuits. It is a flyback converter that stores energy in the core of the transformer T6 when Q1 is ON, and distributes it to three outputs when Q1 is OFF: to a +6.5V primary output through D3, to a +12V primary output through D4, and to a +12V secondary output through D5. The +6.5V output is the only one that is regulated while the others are dependent on the turns ratio of transformer T6. Capacitors C6, C14 and C5 are used for output filtering. R167, R168, R2 and C8 make up the snubber circuit for Q1. R29 limits the current through the input zener of U3 in case of over voltage. The +6.5V output is the input of linear regular U1, which is used to produce a regulated +5V supply at the primary. This is necessary because the GAL requires a very well filtered source and the regulator has a good common mode rejection rate. A "Low Dropout" type regulator is used for better efficiency. The flyback converter is controlled with current mode PWM IC U3. It is operated at a switching frequency of 100 kHz and is synchronized with the boost and forward converters.

The auxiliary power supply start-up is done using the circuit consisting of R166, R5, C20, C21 and D1. Capacitors C20 and C21 are slowly charged by the bulk capacitor voltage through R166 and R5, and the voltage across them is clamped by D1. This voltage is fed to pin 7 of the PWM IC U3, which activates it, and the auxiliary power supply starts operating. After start-up, the IC is powered by the +12V primary voltage produced by the power supply.

Startup of the Auxiliary Power Supply

Figure 14:
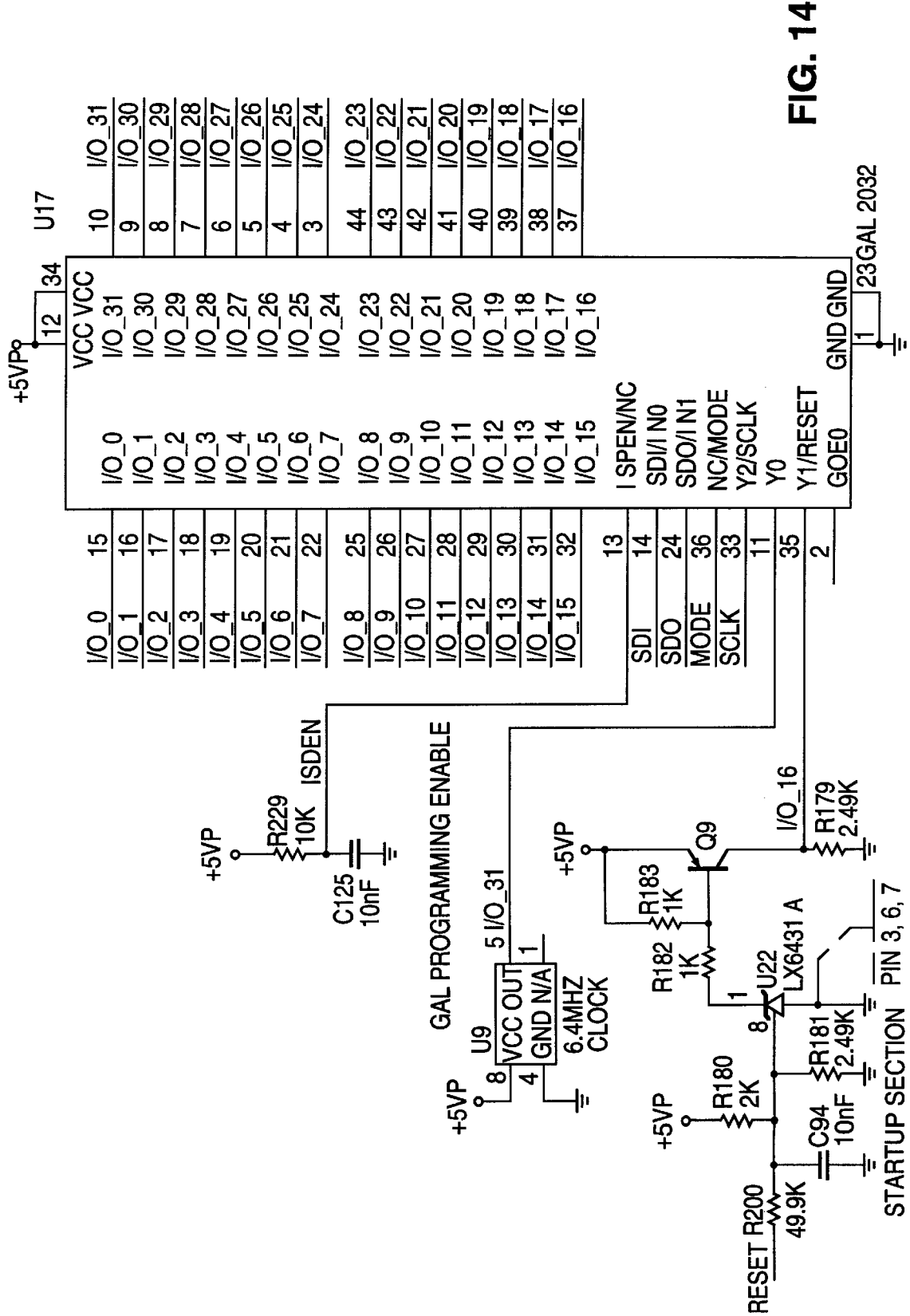
FIG. 14 illustrates the connection of a gate array logic (GAL) installation according to the second embodiment.

As shown in FIG. 14, the boost and forward converter are disabled during the startup of the auxiliary power supply. When the supply voltage reaches 4.5V, the programmable zener U22 turns ON and Q9 sends a signal to the GAL (U17), indicating that the startup has occurred.

AC Inhibit

Figure 20:
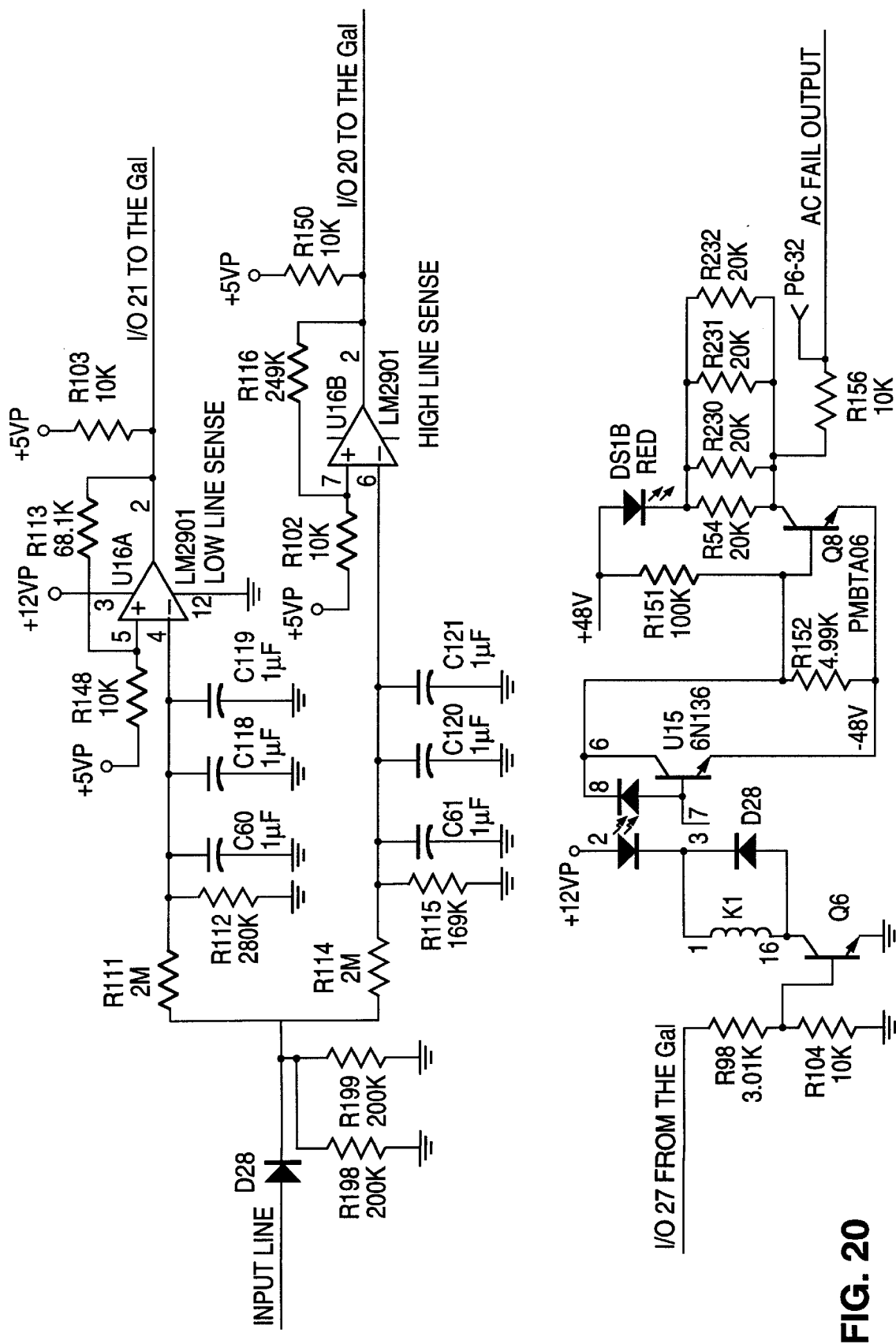
FIG. 20 illustrates a line detection and AC fail alarm according to the second embodiment.

As shown in FIG. 20, the line voltage measurement is made using diode D37, and the bottom diodes of the input diode bridge, D13 and D14. When there is no load, the diode bridges does not conduct current during the whole 60 Hz period of the input source and input current passes through EMI capacitors C117, C67 and C68. Both low and high level sense circuits use a resistive voltage divider to reduce the voltage down to logic level. This voltage is averaged and sent to the negative input of both the low-line sense comparator U16A and the high-line sense comparator U16B. When the low line sense comparator sends a high level signal to pin 42 of the GAL, the GAL disables only the boost converter. It does not disable the forward converter during the holdup time because the rectifier must be able to provide full power for at least 30 ms after the line has been removed.

When the high line sense comparator sends a low level signal to pin 41 of the GAL, the GAL disables both the boost and forward converters. If a high line condition occurs, the bulk capacitor voltage can become high enough to destroy the MOSFETs. The GAL sends a signal to Q6 to open relay K1 whenever the input voltage is out of range. When this happens, optocoupler U15 turns Q8 OFF, and an AC Fail signal is sent to pin 32 of bus connector P6.

Bulk Voltage Inhibit

Figure 21:
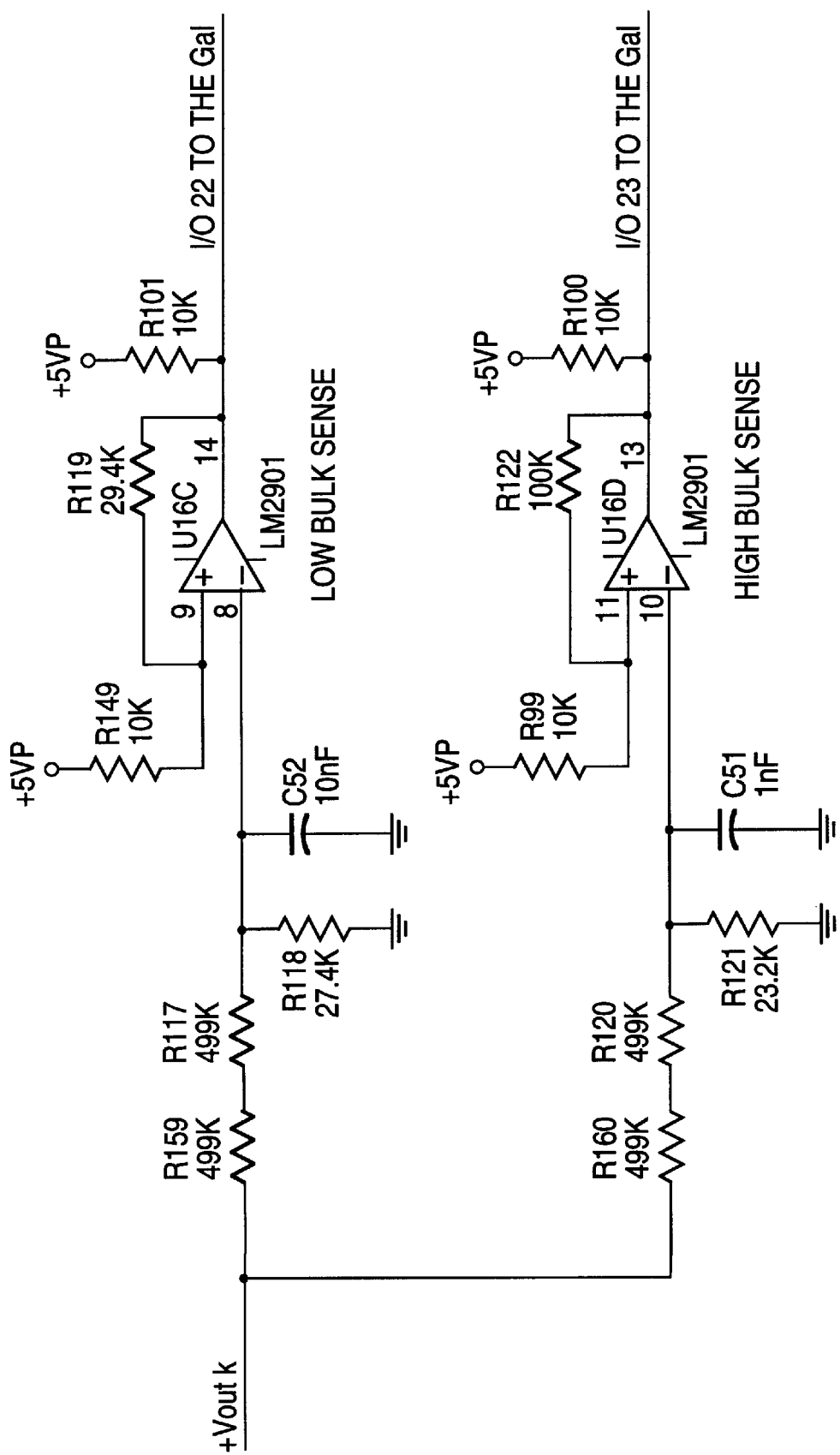
FIG. 21 illustrates a bulk voltage detection circuit for a bulk voltage inhibit control feature according to the second embodiment.

Resistive voltage dividers are used to reduce the bulk capacitor voltage to a level suitable for logic. As shown in FIG. 21, resistors R159, R117 and R118, make up the voltage divider for the low bulk sense circuit, and resistors R160, R120 and R121 make up the voltage divider for the high bulk sense circuit. The stepped down bulk capacitor voltage is sent to the negative input of the two comparators—U16C for the low bulk sense circuit and U16D for the high bulk sense circuit. Resistors R119, R149, R122, and R99 provide hysteresis. The comparator outputs are fed to pins 43 and 44 of the GAL. If there is a high level signal at the low bulk sense comparator output, the GAL disables the forward converter until the boost converter builds up the required voltage. If there is a low level signal at the high bulk sense comparator output, the GAL disables both the boost and the forward converters because the converter MOSFETs can be damaged when the bulk capacitor voltage is very high.

Internal High Voltage Shutdown

Figure 22:
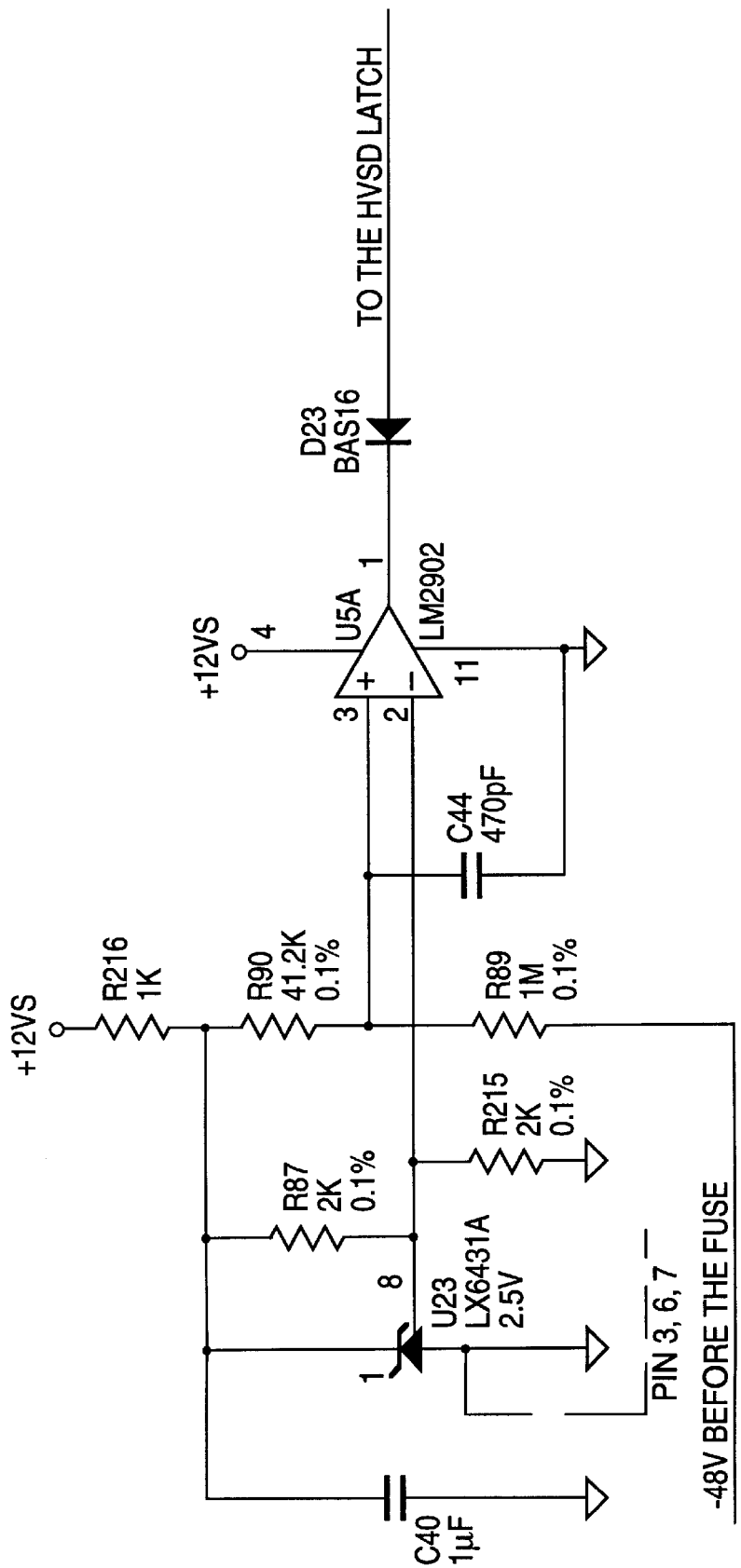
FIG. 22 illustrates an internal high voltage shut-down circuit according to the second embodiment.

As shown in FIG. 22, the output voltage is monitored before the output fuse and compared to a reference signal that is dedicated to the HVSD (U23). When the output voltage increases above 58.25V, the comparator U5A sinks the positive input of latch U12B and sends a HVSD signal to the GAL via U10. The operation of the latch is described below with reference to FIG. 30.

Rectifier Fail

Figure 23:
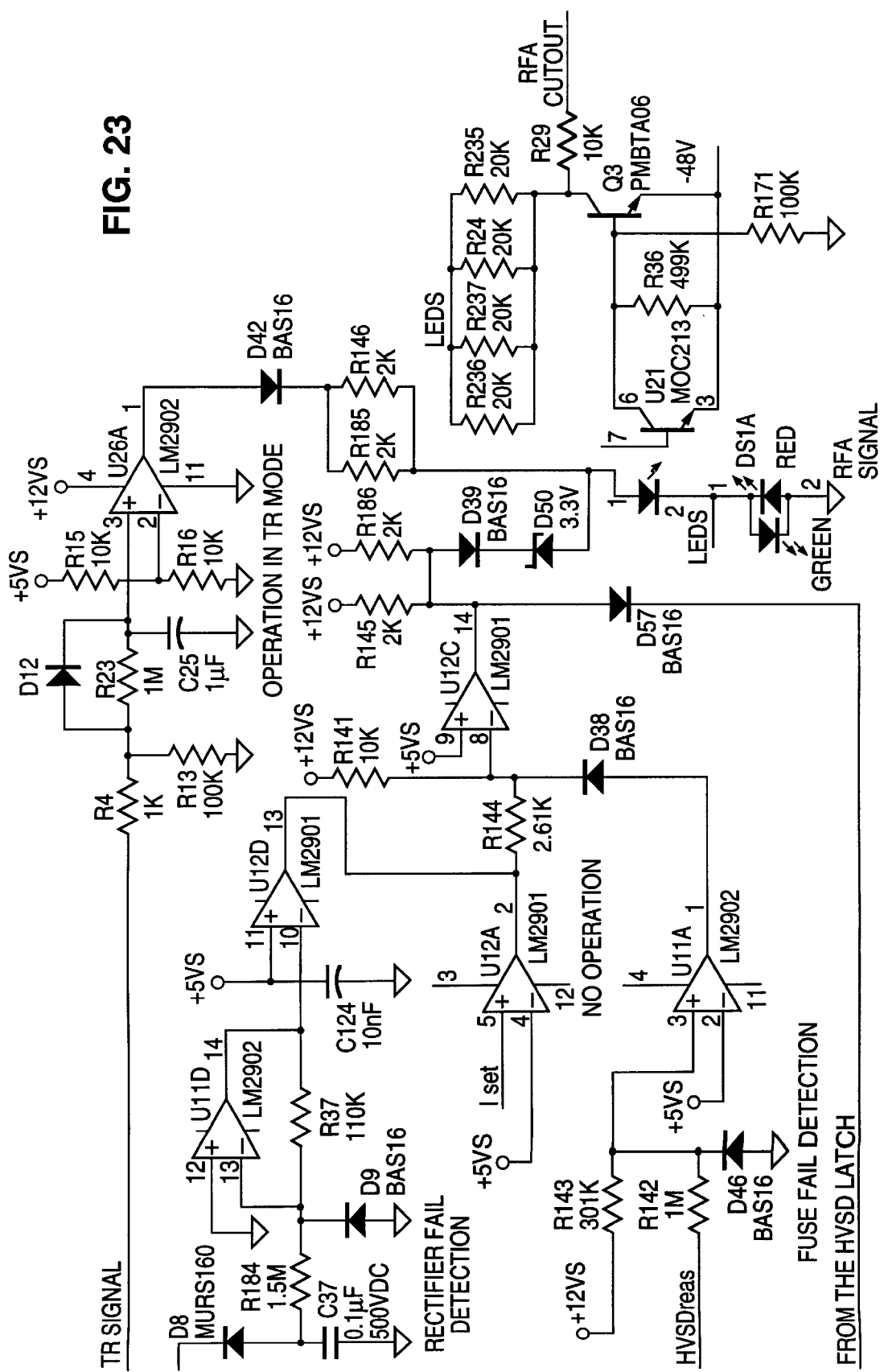
FIG. 23 illustrates a rectifier fail alarm circuit according to the second embodiment.

The Rectifier Fail circuit verifies that the forward converter is operating and sends a signal to pin 29 of connector P6 if it is not. The negative output voltage of transformer T2 is used to charge capacitor C37 through diode D8. Since the capacitor voltage is negative, amplifier U11D (FIG. 23) is used to change its polarity and reduce it so that it can be compared to a voltage reference with U12D (FIG. 23). If the output of U12D is high, then the output of U12C is low. This causes optocoupler U21 to turn Q3 ON and send a signal to P6, and causes LED DS1 to light up red. A Rectifier Fail signal is not sent under no load conditions even though the converter switches are not switching and there is no voltage across the secondary of T2. The output of the error amplifier of the forward converter voltage loop, which is monitored by U12A, is low when there is no load, but the positive input of U12C is kept high to prevent the RFA signal from being sent to P6. A Rectifier Fail signal is not sent under Temporary Release condition.

Current Limit and Power Limit

Figure 24:
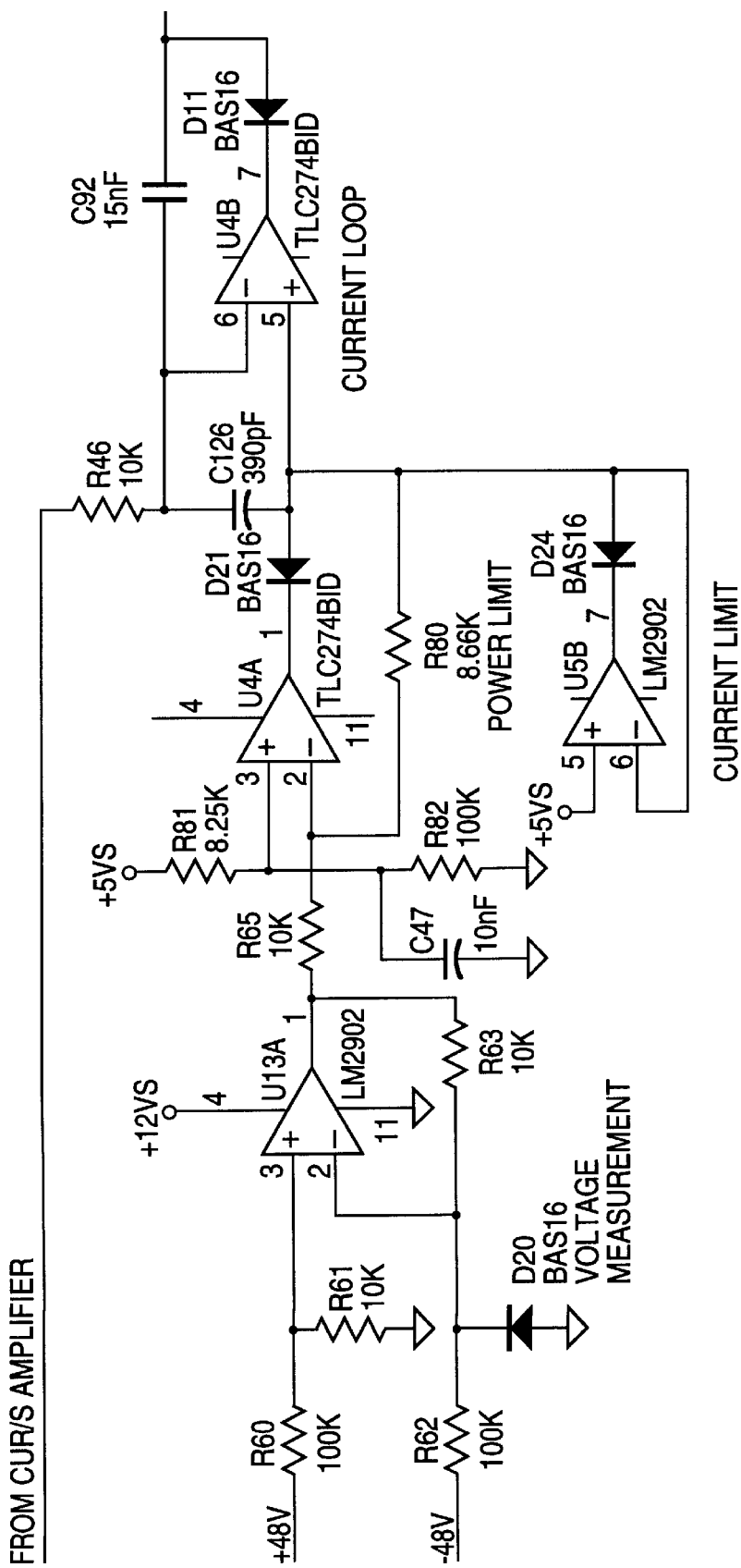
FIG. 24 illustrates a current and power limit circuit according to the second embodiment.

As shown in FIG. 24, the outputs of the current limit and power limit circuits are fed to error amplifier, U4B. The circuit with the lower output will dominate because of diode D11. U4B sinks current from the output of U26B when a current or power limit situation is encountered. This decreases the current going into optocoupler U6, which decreases the signal at PWM chip U8. The current limit circuit has been designed so that a +5V reference signal corresponds to a 6A current. If the reference signal is higher than +5V, then the current reference will be higher than 6A, thus exceeding the current limit. To prevent this situation from occurring, voltage follower U5B and diode D24 will clamp the reference signal to +5V, and the forward converter will operate in current limit mode. The current limit at U8 is adjusted at pin 7. Amplifier U4A has been designed to generate a current reference with respect to the output voltage (obtained from U13A) to limit the output power to 250 W.

Temporary Release

Figure 25:
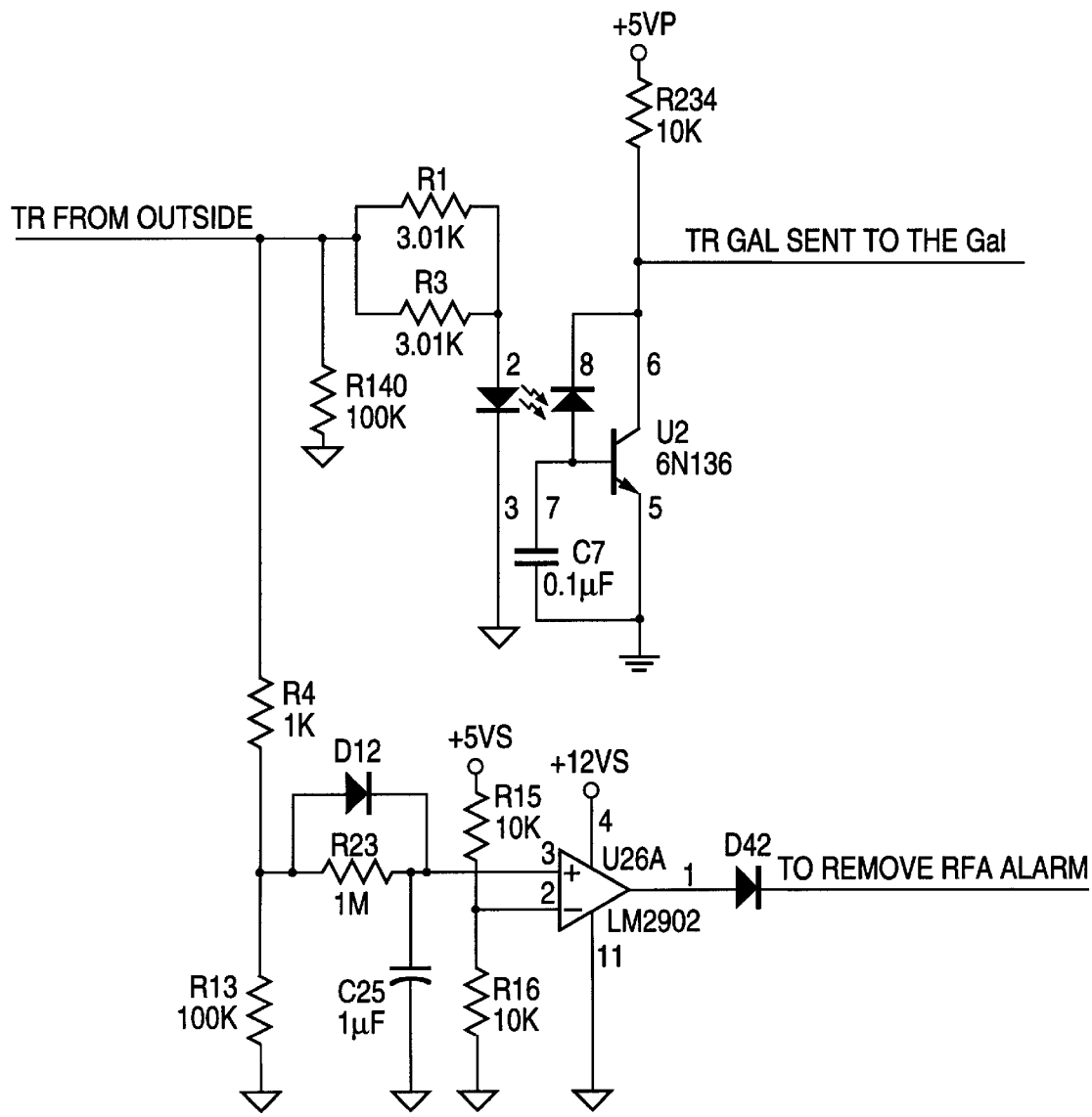
FIG. 25 illustrates a temporary release circuit according to the second embodiment.

As shown in FIG. 25, the Temporary Release signal is sent from pin 31 of connector P6 through optocoupler U2 U4B to the GAL (U17). The GAL then disables the boost and forward converters. The Temporary Release Signal is also sent to comparator U26A, which lights up LED DS1A green and keeps U21 ON. R4, R13, R23 and C25 generate a delay when the TR is removed, before sending RFA, to permit the rectifier to operate normally. When a TR is applied, D12 bypass this delay to make sure no RFA is applied. The rectifier provides a +12V power supply (with 500 Ω impedance), on pin P6-28 to power the TR by external circuitry.

Reference Voltage

Figure 26:
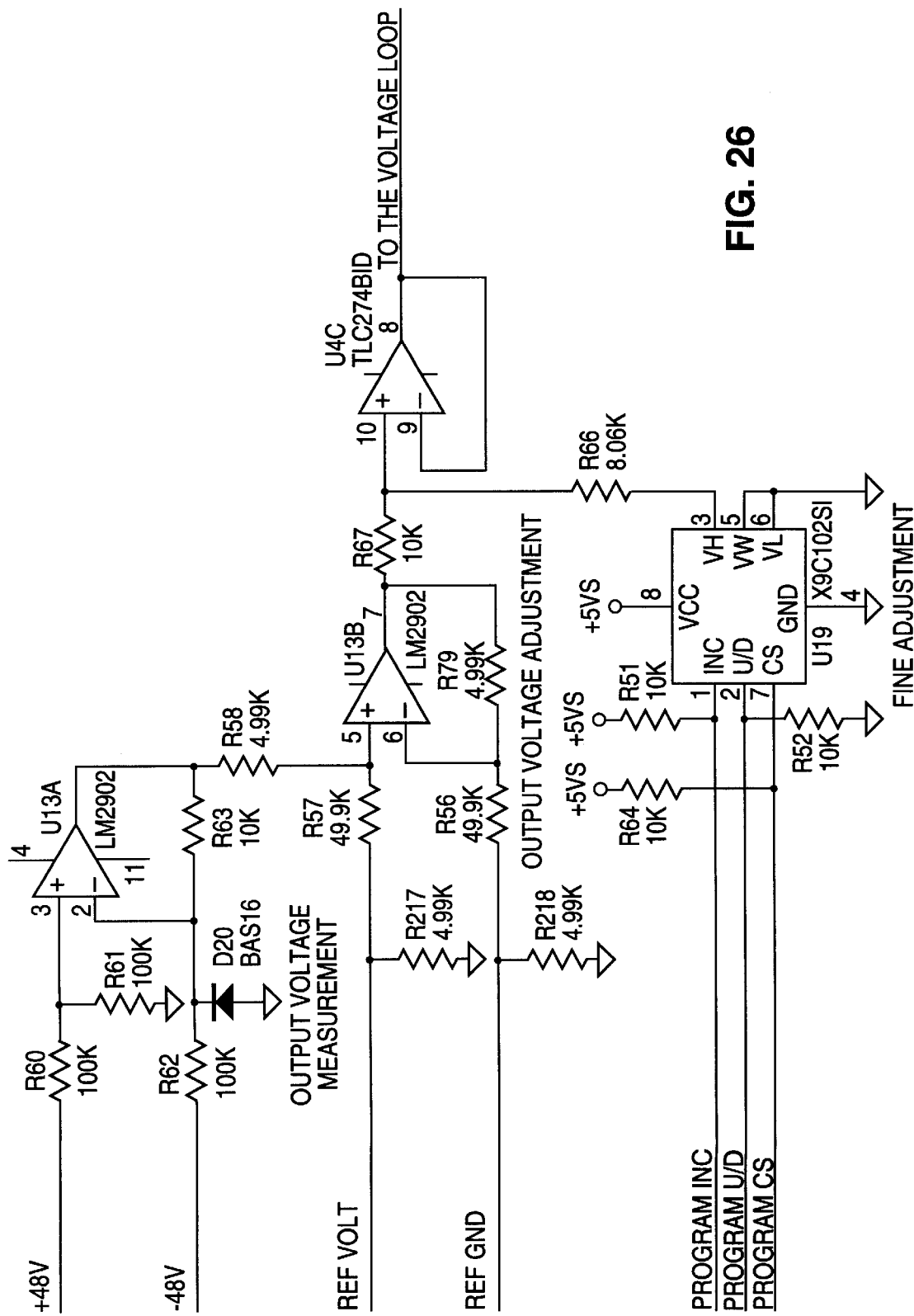
FIG. 26 illustrates an output voltage adjustment circuit according to the second embodiment.

As shown in FIG. 26, the output voltage is set by a remote signal from pin 38 of P6 U4B—the higher the signal, the lower the output voltage. It is set at 54.5V when there is no signal. The signal is added to the sensed output voltage, which is attenuated through a differential amplifier (U13A). A programmable potentiometer (U19) has been set so that the output voltage is 54.5 V. This signal is buffered by U4C and sent to error amplifier U26B, where it is compared to a reference voltage generated by U28. The output is sent to optocoupler U6, then to pin 2 of U8.

Reference Current

Figure 27:
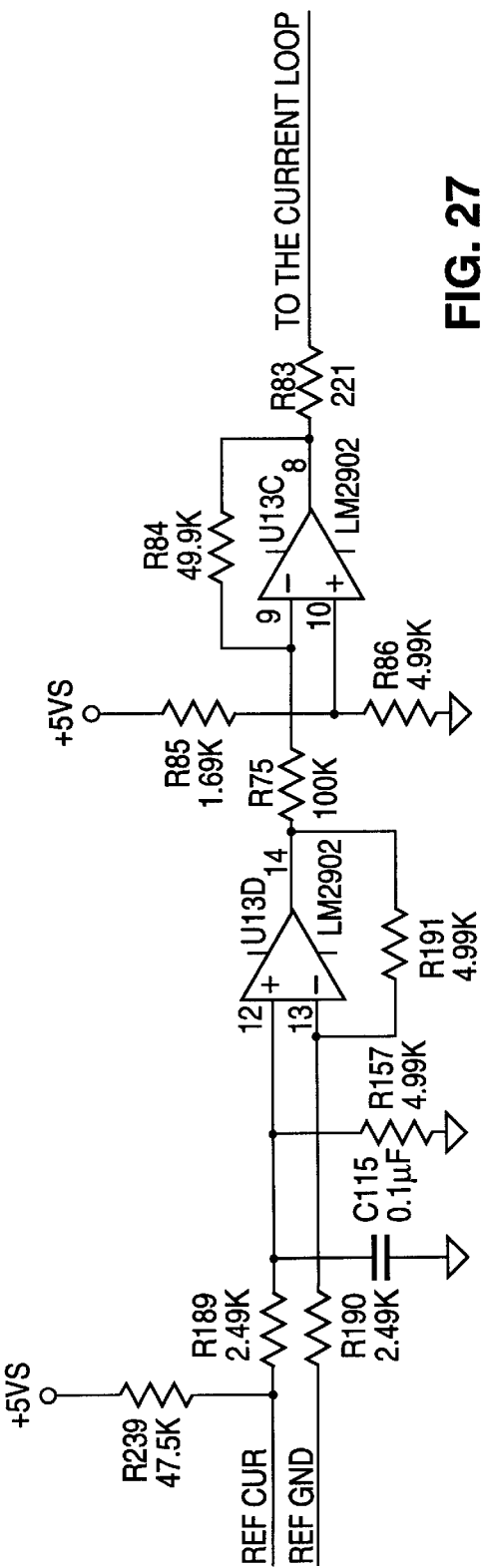
FIG. 27 illustrates an output current adjustment circuit according to the second embodiment.

As shown in FIG. 27, the output current can be set by a remote signal from pin 40 of connector P6. It is set to 6A when there is no signal, and set to 1A when there is a 5V signal. The signal from pin 40 is passed through a differential amplifier U13D with a gain of two, which feeds amplifier U13C, and decreases the current reference. The current reference is also dependent on the outputs of the current limit circuit (U5B) and the power limit circuit (U4A) as was explained above with reference to FIG. 15.

Current Sense

Figure 28:
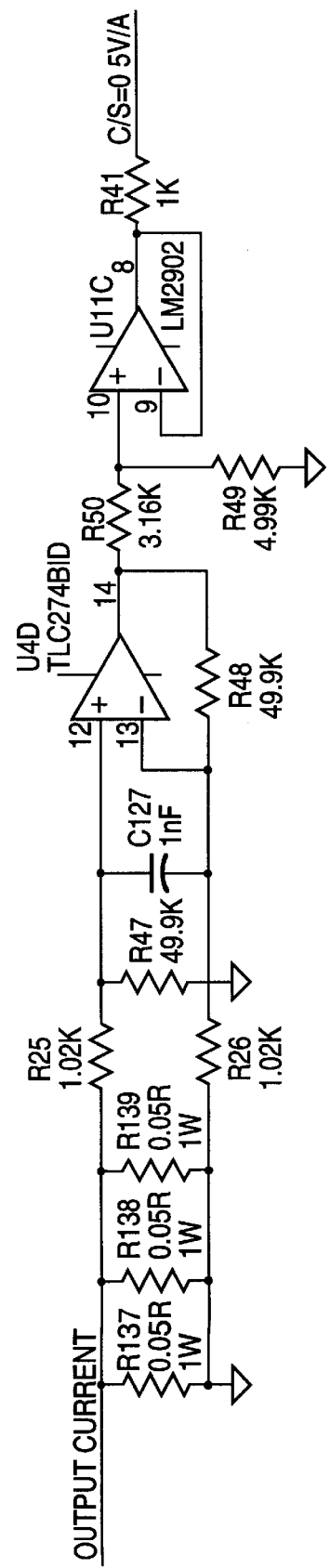
FIG. 28 illustrates a current sense circuit for sensing the forward output current according to the second embodiment.
Figure 29:
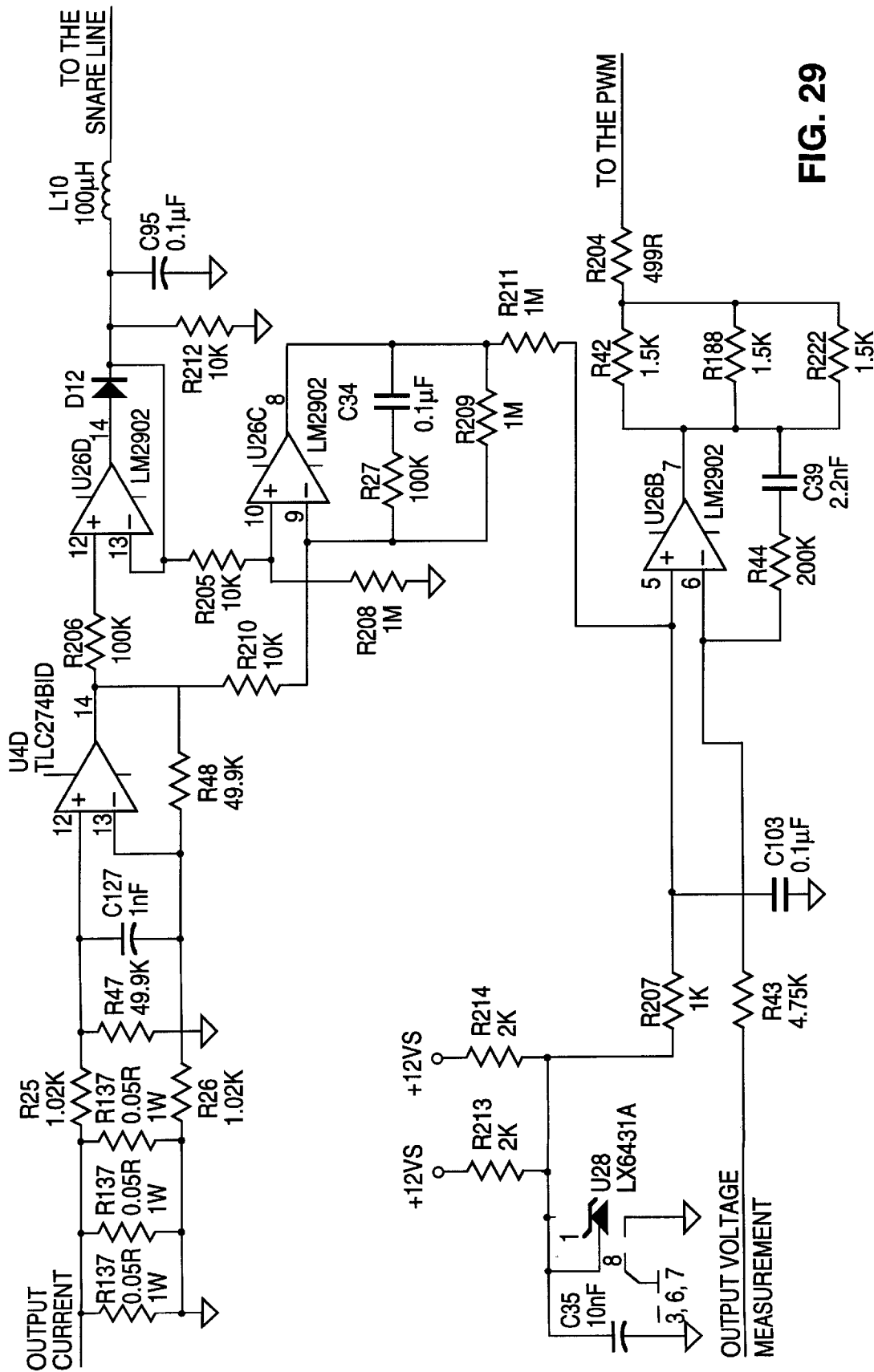
FIG. 29 illustrates a current share signal generating circuit according to the second embodiment.

As shown in FIG. 28, the forward output current is sensed by resistors R137, R138, R139 and sent first to amplifier U4D, then to U11C. The output of U11C is fed to pin 30 of connector P6. This signal is scaled so that 0.5V represents 1A of current.

Current Share

When several rectifiers are paralleled in a system, the load current is shared among them. One rectifier is the master while the rest are slaves. Whether a rectifier is acting as the master or a slave depends on the current that is sensed by U4D (see FIG. 29). The rectifier is designed so that if it is the master, it has a higher current reference than the slaves and thus handles slightly more current. Resistors R205 and R208 have been designed to subtract 1% of the voltage on the C/SHARE line to compare it with the output of amplifier U4D. When the rectifier is acting as a master, diode D49 is forward-biased and a signal is sent to pin 42 of P6. This signal is used to control the output current of the other slave rectifiers. When the rectifier is acting as a slave, it receives a signal from pin 42 and diode D49 is reverse-biased. The curent share circuit output (U26C) adds a little offset to the voltage reference (set by R211 and R207) to set the current 1% lower than the share line, which represents the current of the master rectifier.

Remote High Voltage Shutdown/High Voltage Shutdown Reset

Figure 30:
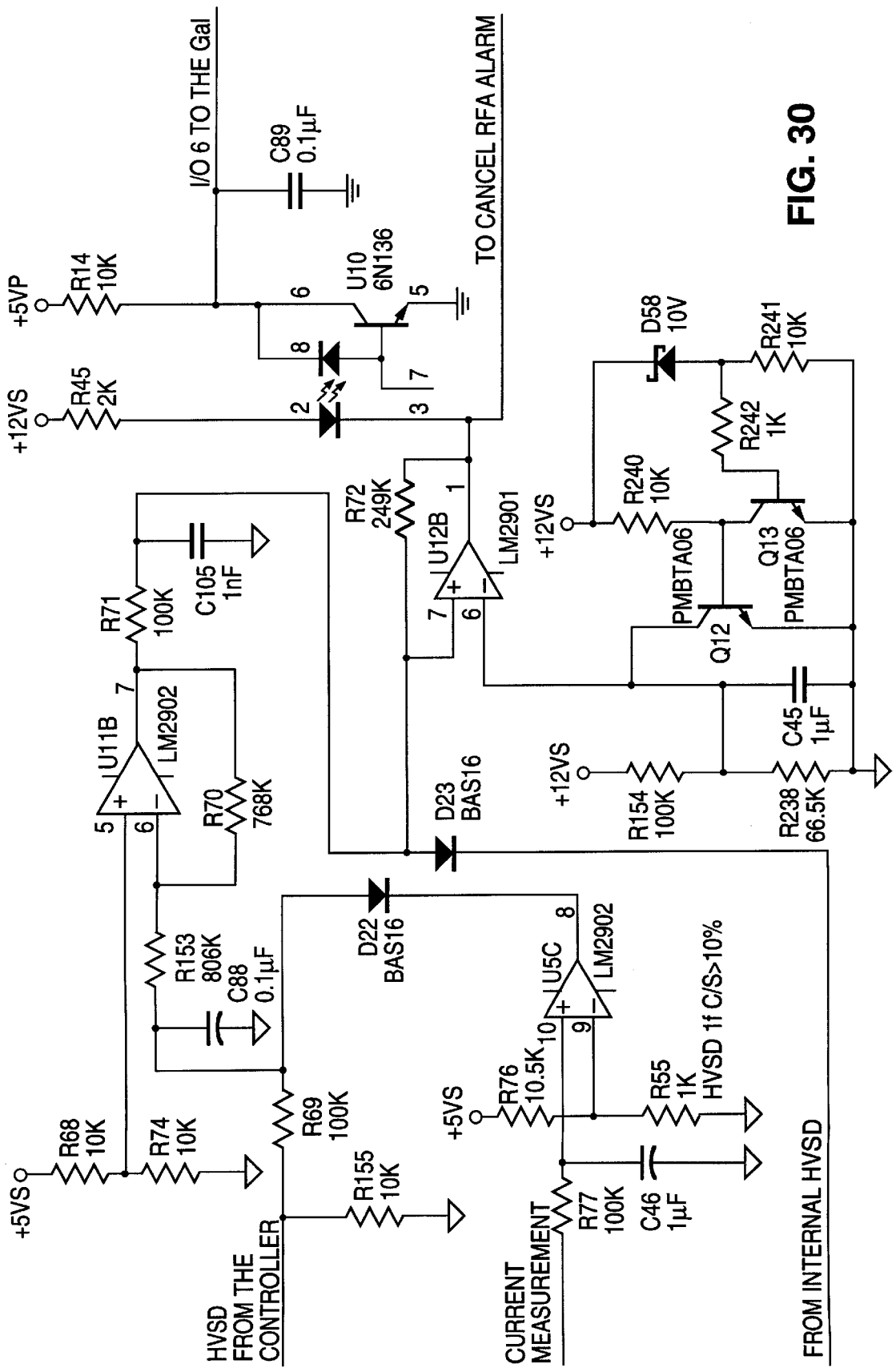
FIG. 30 illustrates a remote high voltage shut-down and high voltage shut-down reset control signal generating circuit according to the second embodiment.

As shown in FIG. 30, the HVSD/HVSDR signal comes from pin 41 of connector P6. Shutdown occurs when the HVSD/HVSDR signal is +5V and reset occurs when the HVSD/HVSDR signal is –5V. U11B changes this signal to 0.38V if it is +5V, and changes it to 8.86V if it is –5V. The modified signal is sent to positive input of comparator U12B, which acts as a latch since it has been designed with a large hysteresis. This signal is compared to a +5V reference obtained from the resistive voltage divider made up of R154 and R238. The reference is sunk to 0V during start-up. When the 0.38V signal is compared to the +5V reference, the latch output is low, and a HVSD signal is sent to the GAL through optocoupler U10. The GAL then disables the forward converter. The latch is reset when the 8.86V signal is sent to the positive input of U12B. The circuit of FIG. 22 (Internal High Voltage Shutdown) (U5A) sinks the positive input of U12B to latch it low in the case of internal HVSD.

Identification

Pin 47 of connector P6 is tied to 12V to identify the rectifier as a 250 W unit.

What is claimed is:

1. A controller system for use with a DC power supply system for telecommunications equipment, said system including at least one power rectifier having a controllable DC output current and voltage and at least one battery being charged by said rectifier and providing DC power during absence of AC power to said rectifier, said controller system comprising:

a controller unit provided separate from said rectifier;

voltage sense leads connected across said battery to measure the DC voltage thereof and connected to said unit;

a control signal bus connecting said unit to said rectifier; and control means associated with said unit for monitoring at least the voltage of said battery and generating variable control signals on said bus for controlling said controllable DC output current and voltage of said rectifier, whereby said bus signals facilitate interconnection between said rectifier and the separate controller unit.

2. The system as claimed in claim 1, wherein said control signal bus is connected to a plurality of said rectifiers.

3. The system as claimed in claim 1, wherein said control means comprises a communications interface means for communicating operational status information from said system to a remote network.

4. The system as claimed in claim 1, further comprising a temperature probe for measuring the temperature of said battery, wherein said control means comprise means for adjusting said rectifier voltage in accordance with said battery temperature.

5. The system as claimed in claim 4, wherein said adjusting means comprise means for setting a temperature compensation factor.

6. The system as claimed in claim 1, wherein said control means comprise means for adjusting a float value of said rectifier.

7. The system as claimed in claim 1, wherein said control means comprise means for setting said rectifier output current.

8. The system as claimed in claim 1, wherein said control bus comprises a rectifier fail alarm signal, and said control means comprises a communications interface means for communicating operational status information from said system to a remote network, said status information including an operational status of said rectifier.

9. The system as claimed in claim 1, wherein said control bus comprises an AC mains fail alarm signal indicative of presence of AC mains power to said rectifier, and said control means comprises a communications interface means for communicating operational status information from said system to a remote network, said status information including an operational status of said AC mains.

10. The system as claimed in claim 1, wherein said control means comprises a non-volatile memory for storing an operational status history of said system.

11. The system as claimed in claim 3, wherein said control means comprises a non-volatile memory for storing operational status history data of said system, said communication means communicating said data to said remote network.

12. A DC power supply system for telecommunications equipment comprising:

a plurality of power rectifiers having a controllable DC output current and voltage;

means interconnecting said power rectifiers to operate synchronously at a same voltage;

at least one battery being charged by said rectifiers and providing DC power for said telecommunications equipement during absence of AC power to said rectifier;

a controller unit provided separate from said rectifiers;

voltage sense leads connected across said battery to measure the DC voltage thereof and connected to said controller unit;

a control signal bus connecting said controller unit to said rectifiers; and control means associated with said controller unit for monitoring the voltage of said at least one battery and generating variable control signals on said bus for controlling said controllable DC output current and voltage of said rectifiers, whereby said bus signals facilitate interconnection between said rectifiers and the separate controller unit.

13. The system as claimed in claim 12, wherein said control means comprises a communications interface means for communicating operational status information from said system to a remote network.

14. The system as claimed in claim 12, further comprising the temperature probe for measuring a temperature of said battery, wherein said control means comprise means for adjusting said rectifier voltage in accordance with said battery temperature.

15. The system as claimed in claim 14, wherein said adjusting means comprise means for setting a temperature compensation factor.

16. The system as claimed in claim 12, wherein said control means comprise means for adjusting a float value of said rectifier voltage.

17. The system as claimed in claim 12, wherein control means comprise means for setting said rectifier output current.

18. The system as claimed in claim 12, wherein said control bus comprises a rectifier fail alarm signal, and said control means comprises a communications interface means for communicating operational status information from said system to a remote network, said status information including an operational status of said rectifier.

19. The system as claimed in claim 12, wherein said control bus comprises an AC mains fail alarm signal indicative of the presence of AC mains power to said rectifier, and said control means comprises a communications interface means for communicating operational status information from said system to a remote network, said status information including an operational status of said AC mains.

20. The system as claimed in claim 12, wherein said control means comprises a non-volatile memory for storing an operational status history of said system.

21. The system as claimed in claim 13, wherein said control means comprises a non-volatile memory for storing operational status history data of said system, said communication means communicating said data to said remote network.

* * * * *